(12) United States Patent
Gray et al.

(10) Patent No.: US 11,250,201 B2
(45) Date of Patent: Feb. 15, 2022

(54) METHODS AND DEVICES FOR PROVIDING OPTIMAL VIEWING DISPLAYS

(71) Applicant: Amazon Technologies, Inc., Seattle, WA (US)

(72) Inventors: Timothy Thomas Gray, Seattle, WA (US); Thomas Irvine Nelson, Seattle, WA (US); Jae Pum Park, Bellevue, WA (US); Shilpan Bhagat, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 404 days.

(21) Appl. No.: 15/182,410

(22) Filed: Jun. 14, 2016

(65) Prior Publication Data
US 2018/0196782 A1 Jul. 12, 2018

(51) Int. Cl.
*G06F 40/106* (2020.01)
*G06F 3/0488* (2013.01)
(Continued)

(52) U.S. Cl.
CPC ............ *G06F 40/106* (2020.01); *G06F 3/005* (2013.01); *G06F 3/0482* (2013.01);
(Continued)

(58) Field of Classification Search
None
See application file for complete search history.

(56) References Cited

U.S. PATENT DOCUMENTS

| 8,209,635 B2* | 6/2012 | Thom | G06F 1/1626 345/156 |
| 8,654,076 B2* | 2/2014 | Ronkainen | G06F 3/0488 345/157 |

(Continued)

FOREIGN PATENT DOCUMENTS

| AU | 2015201905 A1 | 7/2015 |
| CN | 103207668 A | 7/2013 |

(Continued)

OTHER PUBLICATIONS

International Search Report and Written Opinion for International Application No. PCT/US2017/037280 dated Jan. 17, 2018 (21 pgs.).

(Continued)

*Primary Examiner* — Christopher J Fibbi
(74) *Attorney, Agent, or Firm* — Eversheds-Sutherland (US) LLP

(57) ABSTRACT

Systems and methods for presenting a user interface in a first mode and a second mode based on detection of a touch gesture is described herein. In some embodiments, a first user interface may be presented on an electronic device's display. The first user interface may include a list of items, which may be formatted such that they are optimally viewable from a first distance away from the display. In response to detecting a touch gesture, such as a scrolling gesture, a second user interface may be presented including the list of items, which may be formatted such that they are optimally viewed from a second distance. For example, the first user interface may be optimally viewable from a distance of approximately seven to ten feet from the display. As another example, the second user interface may optimally viewable from a distance of approximately one to three feet.

19 Claims, 9 Drawing Sheets

(51) Int. Cl.
    *G06F 3/16*         (2006.01)
    *G06F 3/0485*     (2013.01)
    *G06F 3/00*         (2006.01)
    *G06F 3/0482*     (2013.01)
    *G06F 3/0484*     (2013.01)
    *G06T 7/11*         (2017.01)
    *G06F 40/109*     (2020.01)
    *G06K 9/00*         (2006.01)
    *G10L 15/30*      (2013.01)

(52) U.S. Cl.
    CPC .......... *G06F 3/0484* (2013.01); *G06F 3/0485* (2013.01); *G06F 3/0488* (2013.01); *G06F 3/167* (2013.01); *G06F 40/109* (2020.01); *G06K 9/00228* (2013.01); *G06T 7/11* (2017.01); *G06F 2203/04806* (2013.01); *G10L 15/30* (2013.01)

(56) References Cited

U.S. PATENT DOCUMENTS

| | | | |
|---|---|---|---|
| 2008/0134081 A1 | 6/2008 | Jeon et al. | |
| 2009/0141147 A1* | 6/2009 | Alberts | G06F 3/012<br>348/240.99 |
| 2009/0164896 A1* | 6/2009 | Thorn | G06F 3/048<br>715/700 |
| 2009/0237372 A1* | 9/2009 | Kim | G06F 3/044<br>345/173 |
| 2010/0283743 A1* | 11/2010 | Coddington | G06F 3/0485<br>345/173 |
| 2012/0057794 A1* | 3/2012 | Tsurumi | G06T 11/60<br>382/195 |
| 2013/0219277 A1* | 8/2013 | Wang | G06F 3/167<br>715/728 |
| 2015/0161477 A1* | 6/2015 | Kashyap | H04N 21/4126<br>382/181 |
| 2016/0170596 A1* | 6/2016 | Kimura | G06F 3/0488<br>715/784 |
| 2017/0090560 A1* | 3/2017 | Chen | G06F 3/013 |

FOREIGN PATENT DOCUMENTS

| | | |
|---|---|---|
| CN | 103780945 A | 5/2014 |
| EP | 2950307 A1 | 2/2015 |

OTHER PUBLICATIONS

CNIPA, "First Office Action" App. No. 201780037354.5, dated Sep. 2, 2021; 16 pages.

* cited by examiner

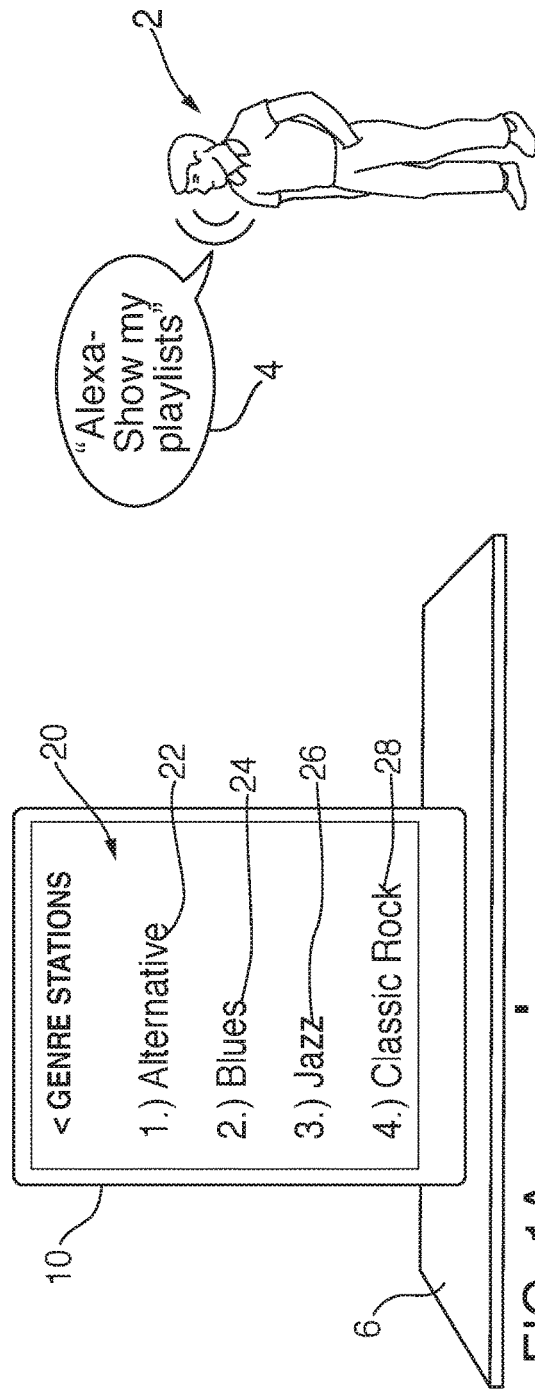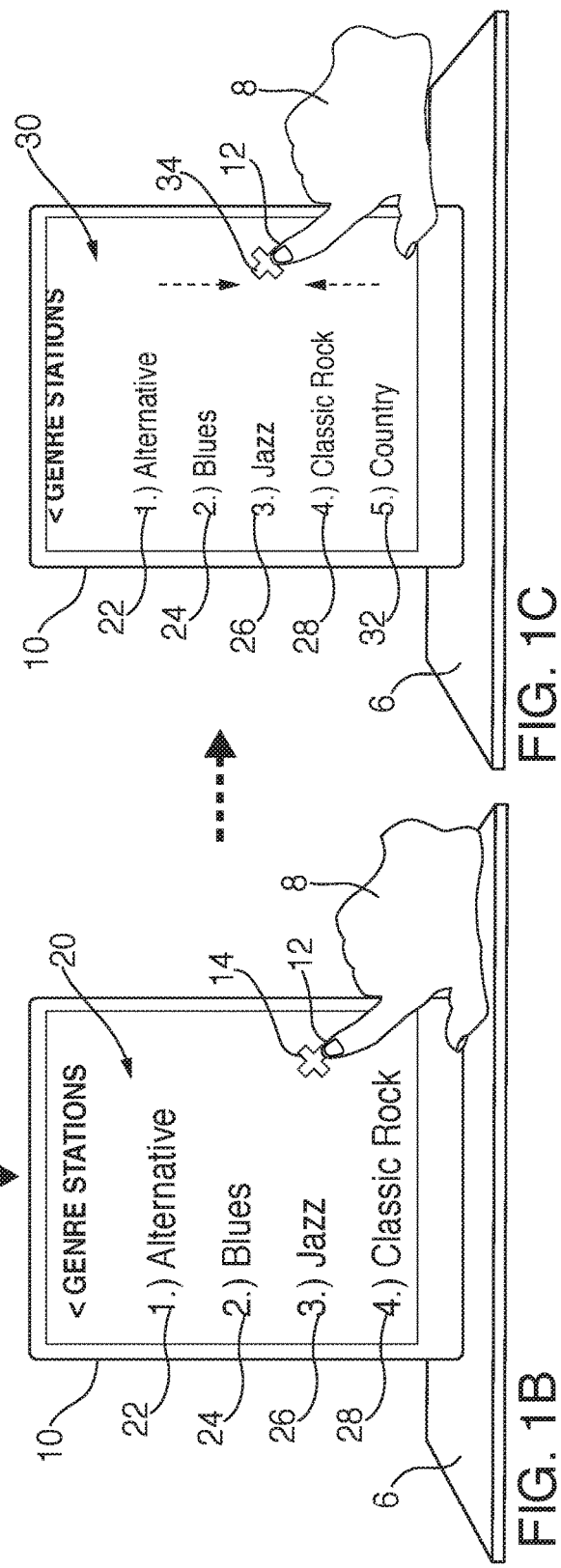

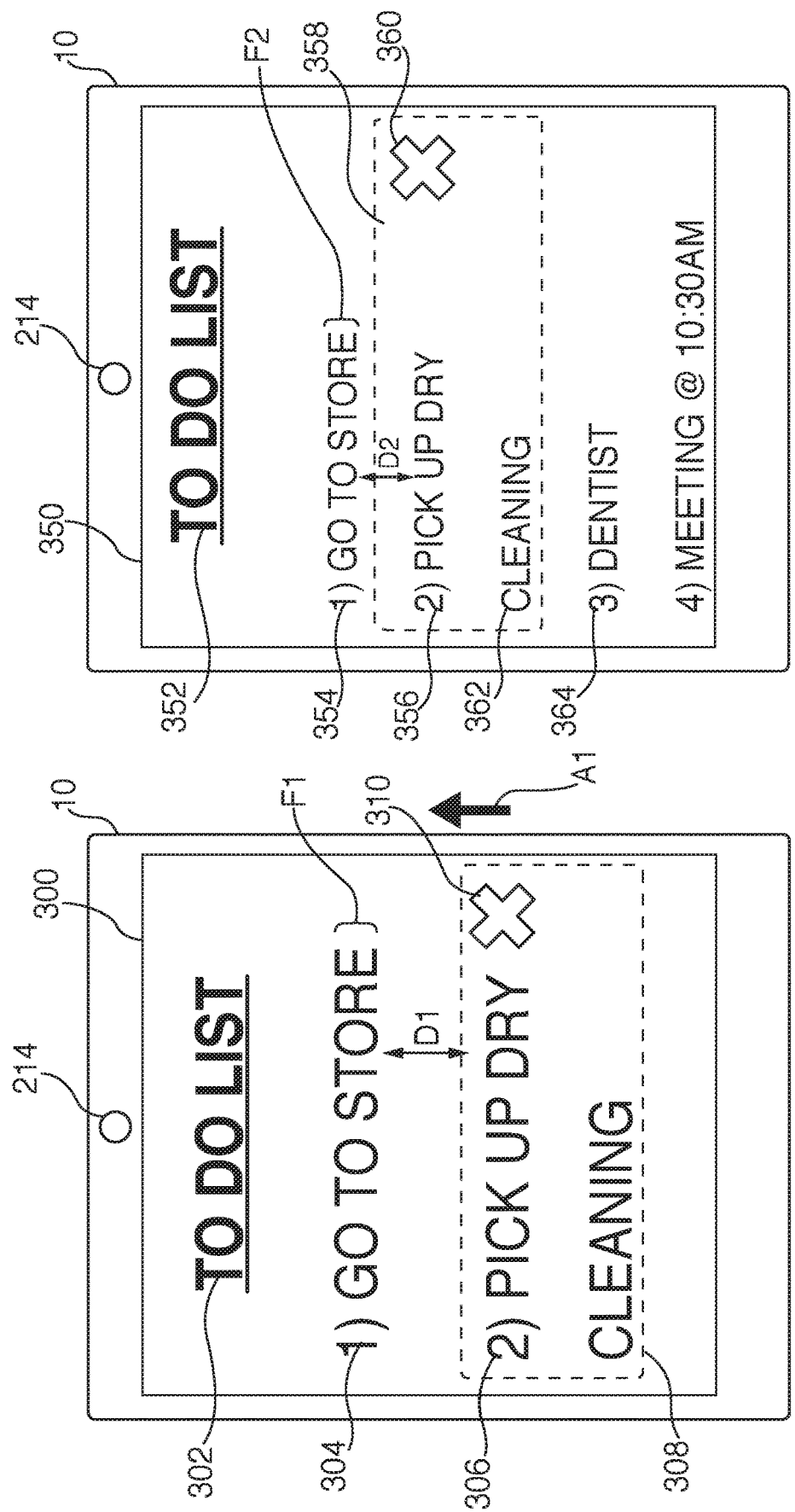

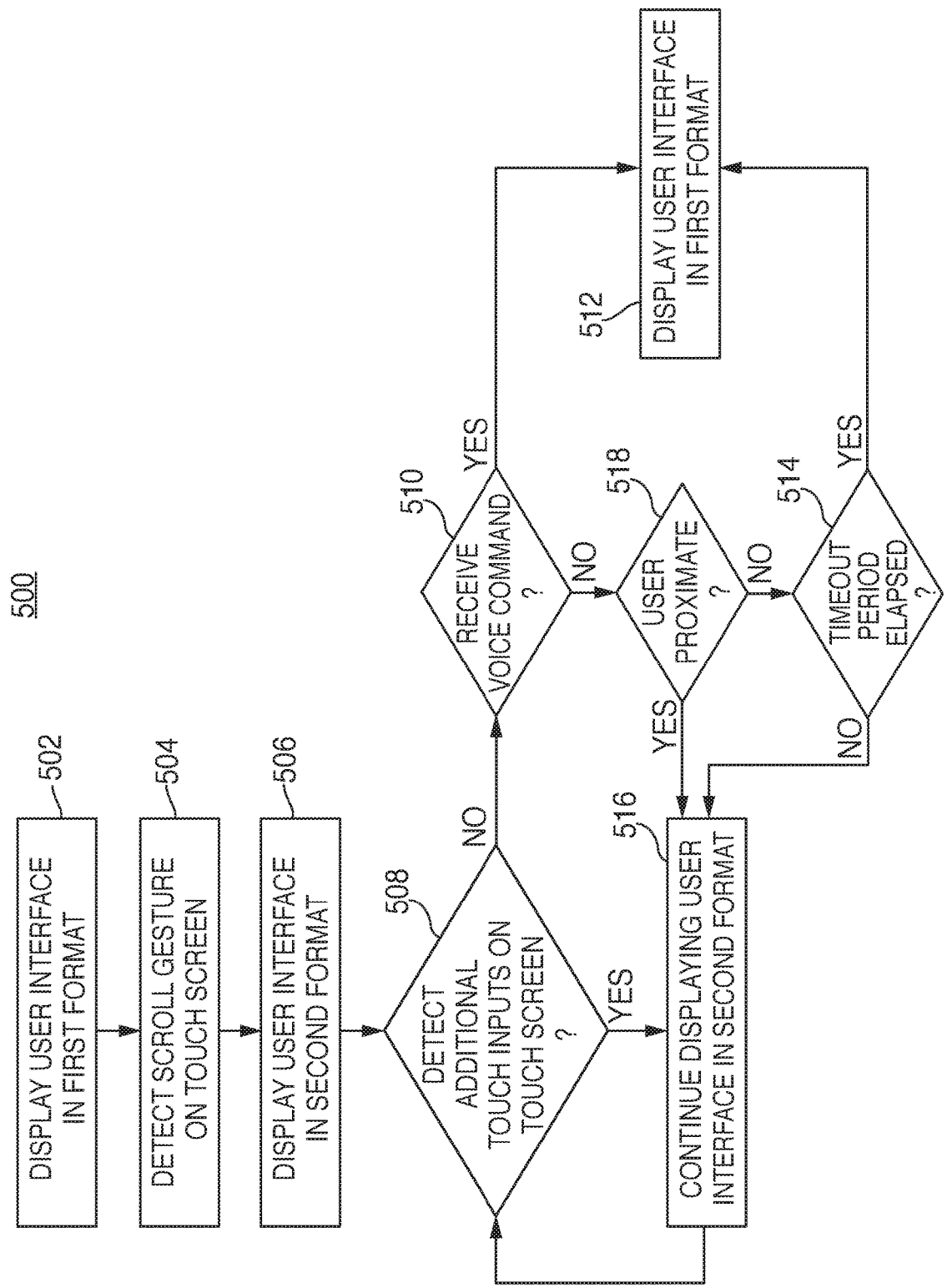

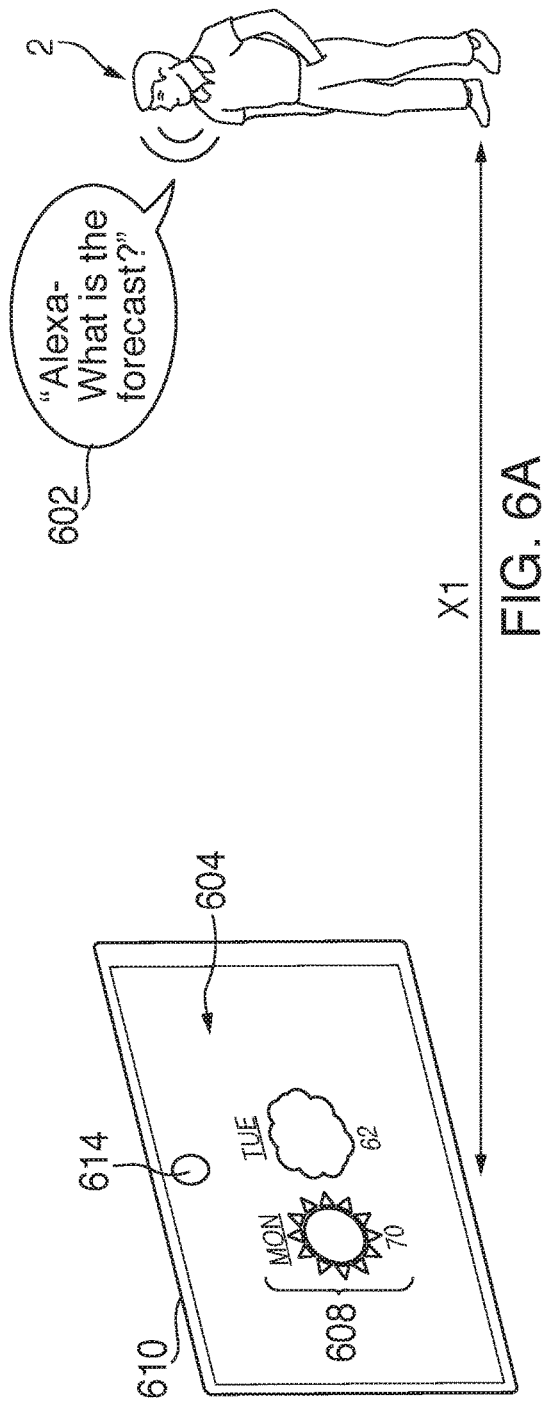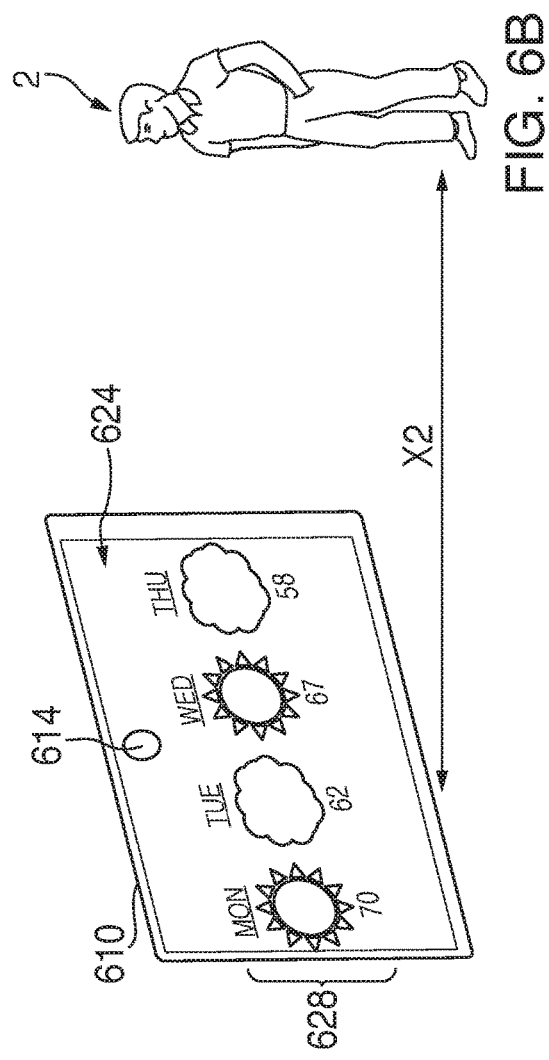

METHODS AND DEVICES FOR PROVIDING OPTIMAL VIEWING DISPLAYS

BACKGROUND

Many devices exist that include display screens, such as touch screen. These devises are configured to display content, such as pictures, lists, video, etc. The content is typically presented in one format depending on whether an individual is far away from the device, or close to the device.

BRIEF DESCRIPTION OF THE DRAWINGS

FIGS. 1A-C are illustrative diagrams of an electronic device presenting content on a display screen in a first format and a second format, in accordance with various embodiments;

FIGS. 3A and 3B are illustrative diagrams of a user interface being presented in a first format and a second format, respectively, in response to a scrolling gesture, in accordance with various embodiments;

FIG. 5 is an illustrative flowchart of a process for presenting a user interface in a first format or a second format depending on additional inputs to an electronic device, in accordance with various embodiments;

FIGS. 6A-D are illustrative diagrams of an electronic device presenting various user interfaces depending on a proximity of an individual to the electronic device, as well as touch gestures performed to the electronic device, in accordance with various embodiments.

DETAILED DESCRIPTION

Figure 2A:
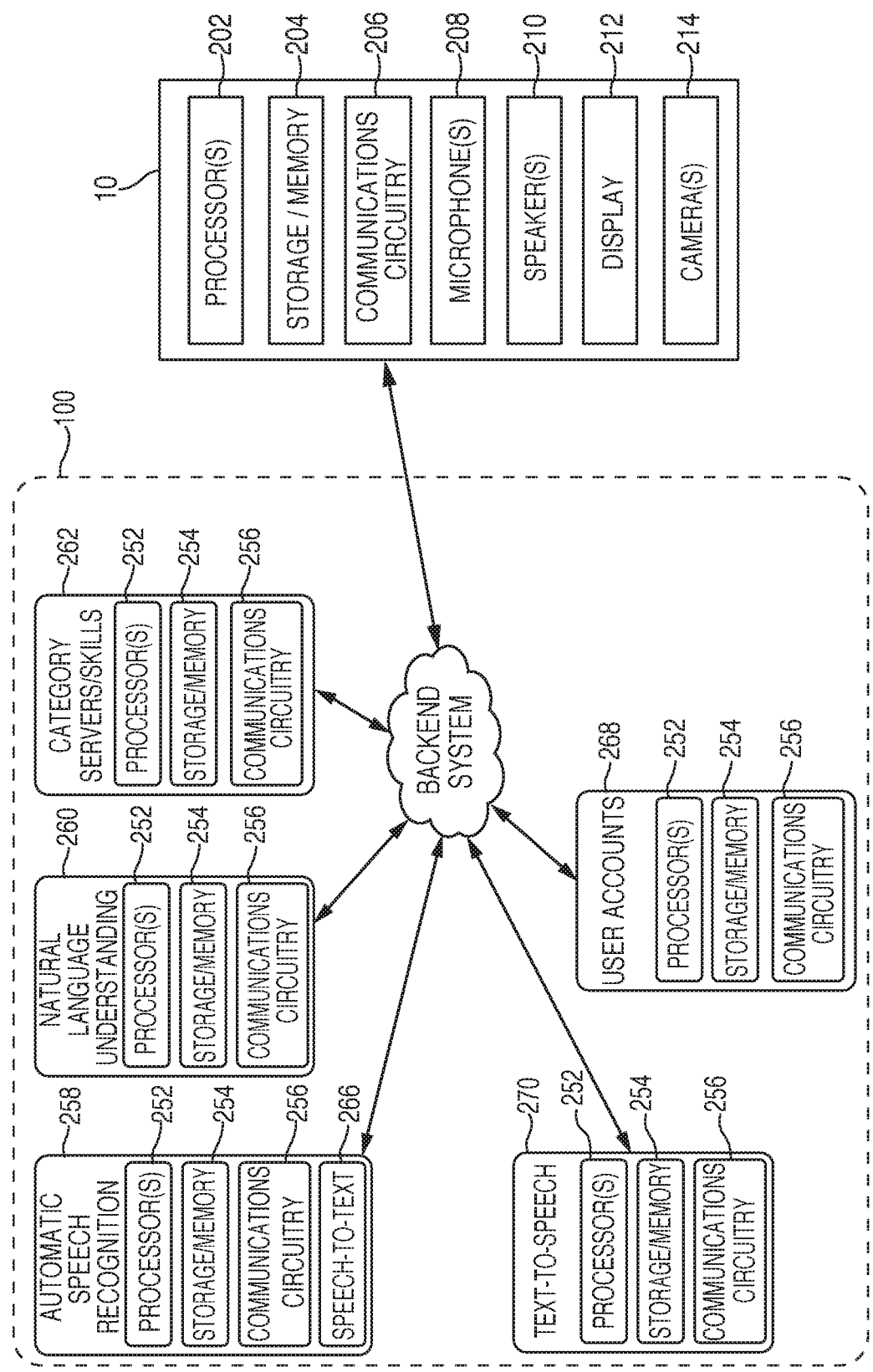
FIG. 2A is an illustrative diagram of an electronic device in communication with a backend system, in accordance with various embodiments.

The present disclosure, as set forth below, is generally directed to various embodiments of methods and devices for presenting content on a display screen, and modifying a format of the content being presented based on whether a particular gesture is detected. In some embodiments, a first list of items may be displayed on a touch screen of an electronic device. The first list of items may be displayed in response to an utterance being detected by the electronic device. For example, an individual may say a command prefaced by a wakeword for the device. In response to detecting the wakeword, the electronic device may interpret the subsequent speech as an actionable input. Audio data representing the utterance may be sent to a backend system. The backend system may, in response to determining that the speech corresponded to a request to view a list or other content, send display data for a first user interface to be displayed to the electronic device.

The electronic device may receive the display data from the backend system, and may be configured to present the first user interface including one or more items, such as a list of items, on a touch screen of the electronic device. In some embodiments, the list of items may be displayed in a first format within the first user interface. For example, the list of items may be formatted so that the first user interface is optimally viewable from a first distance away from the electronic device. As an illustrative example, the list of items may be formatted so that an individual standing approximately seven to ten feet away, or greater than an "arm's reach," from the electronic device is capable of clearly viewing the items. In one non-limiting embodiment, the first format may correspond to the items being displayed in a first font size. Furthermore, items of the list may be displayed on a separate lines having a first line spacing between one item on one line and another item on a subsequent line. Continuing the illustrative example, the items may be displayed in a large font have a large line spacing between the items, thereby making the user interface easily readable from approximately seven to ten feet away.

In one exemplary embodiment, only a portion of the list of items may be presented within the first user interface. For example, if the list includes ten items, each one being located on a separate line, then in the first format only a first four items may be displayable. This may be due to the font size and line spacing settings for the first format. Depending on the display screen's size, only a certain number of items, or certain portion of the content, may be able to be displayed on the display screen in the first format.

In some embodiments, an individual may approach the electronic device in order to interact, or modify, the content displayed thereon. For example, an individual may want to scroll through the list of items, and may approach the electronic device to perform a touch gesture that causes the list to be scrolled through. The individual may contact the touch screen using one or more fingers and may perform a scroll gesture, for example. For instance, the individual may contact the touch screen in a first location and, while maintaining contact with the touch screen, move their finger(s) vertically, substantially vertically, horizontally, and/or substantially horizontally.

The electronic device may detect the scroll gesture by first determining that contact with the touch screen has occurred for more than predefined time period indicating that the gesture is not a tap gesture. For instance, a tap gesture may correspond to an object, such as one or more fingers, contacting the touch screen for a relatively small amount of time (e.g., less than one second), and then quickly releasing contact. Therefore, if contact with the touch screen is maintained for longer than the relatively small amount of time, the touch gesture likely correspond to a non-tap gesture. After it is determined that the gesture is a non-tap gesture, the electronic device may further detect that an object, which may be the same object that was in contact with the touch screen at the first location, may now be contacting the touch screen at a second location. Furthermore, the electronic device may determine that the object remained in contact with the touch screen from the first location to the second location, indicating that the object performed a scroll gesture.

A scroll gesture may correspond to a type of touch gesture that may be performed by an individual to a touch sensitive display screen. For example, a touch-based "scrolling" gesture may correspond to a touch input performed by an object, such as one or more fingers, on a touch sensitive display screen that causes text, images, and/or video to slide across the touch sensitive display screen, either vertically, horizontally, or in any other suitable direction. In general, a scrolling gesture may cause a text and/or image layout to remain unchanged, however the individual's view across an apparently larger image that may not be entirely seen may move. Scrolling gestures may be performed in discrete increments (e.g., one or more lines of text or pixels displayed by the touch sensitive display move), or continuously, for example. Another type of scrolling gesture may be referred to as a touch-based "swipe" gesture, for example, which may allow an individual rapidly visually scan through displayed content, which may correspond to images, text, video, user interfaces, and the like, by moving an object, such as their finger or fingers, in a substantially straight direction across the touch sensitive display screen. For instance, an individual may perform a "swipe" gesture about a displayed image catalog to quickly view the images included therein. As still yet another example, and individual may perform a "dragging" gesture, which selects and moves a displayed item in response to an input, such as a tap or click, being performed on the displayed item and, while staying in contact with the displayed item on the display screen, moving one's finger or mouse to a new location on the display screen, where contact with the displayed item then ceases.

In some embodiments, the electronic device may be configured to modify or change the displayed content in response to detecting the non-tap (e.g., scroll) gesture. For instance, if an individual performed a scrolling gesture on the electronic device's touch screen, this may indicate that the individual is now located closer (e.g., within "arm's reach") to the electronic device. Therefore, the displayed content may be modified from the first format, which was optimized for an individual located at a first distance from the electronic device, to now being displayed in a second format, which may be optimized for an individual located at a second distance from the electronic device. For example, the user interface may now be formatted so that it is optimally viewable by an individual located approximately one to three feet from the electronic device. As another example, a second user interface may be presented in the second format.

The second format may present the items or content such that each item is displayed smaller (e.g., having a reduced font size) than when displayed in the first format. For example, the items may be displayed in a second font size, which may be smaller than the first font size. Furthermore, a line spacing between the items of the list may also be reduced. As an illustrative example, the font size and spacing may both be reduced such that the font size and spacing of within the first format of the first user interface is approximately 1.5 to 2.0 times larger than the font size and spacing within the second format of the second user interface. However, any suitable font size and line spacing may be employed within the first and second format, and the aforementioned are merely exemplary. Furthermore, the font size and line spacing may be constrained by a size of the display screen of the electronic device. For example, a display screen that is relatively small in size may only be able to present content in one font size, and therefore the number of items, or the amount of content, presentable on that display screen may be limited.

In some embodiments, one or more additional items from the list may also be included when the user interface is presented in the second format. As an illustrative example, in the first format, only four items out of ten total items of a list may be capable of being displayed within a first user interface due to the first format's font size and line spacing. However, in the second format, the font size and line spacing may be reduced. Therefore, in this particular example, two or three additional items of the ten items may be able to be displayed so that now six to seven items from the list are presented. Thus, in the second format, one or more additional items from the list may be displayed, allowing an individual to have a greater number of options from which to view, select, and/or interact with.

In some embodiments, the change from the first format to the second format may occur so that a selected item moves about the display screen with the scrolling gesture. For example, the object (e.g., a finger) may have contacted a touch screen at a first location associated with a first horizontal position and a first vertical position. An item displayed on the touch screen may be displayed along a same horizontal axis (e.g., at a same vertical position but different horizontal position) as the first location where the object contacted the touch screen. The electronic device may select that item, and the item may become highlighted, shaded, or modified in any suitable manner to visually indicate that the item has been selected. As the scrolling gesture is performed, the object may move from the first location to a second location while remaining in contact with the touch screen. The item may also move along the same direction as the scrolling gesture so that the item remains "in-line" with the object. For example, if the object moves vertically about the touch screen such that it moves from to a new vertical position while maintaining the same horizontal position, the item would also move to the same new vertical position while maintaining its same horizontal position. In this way, after the scrolling gesture ends at the second location, the item will also be located along a same horizontal line as the second location where the object stops contacting the touch screen.

In one illustrative embodiment, the user interface may continue to be presented in the second format until no more touch inputs are detected thereon. For instance, if no touch inputs are determined to have been detected after a certain amount of time has elapsed (e.g., five seconds, ten seconds, thirty seconds, etc.), then the electronic device may be configured to display the user interface in the first format. If no additional touch inputs were detected during the amount of time, this may indicate that an individual has stopped interacting with the electronic device. This amount of time, for example, may be referred to as a "timeout" period. In some embodiments, if no additional touch inputs have been detected for greater than predefined amount of time, then the electronic device may be configured to stop displaying content all together. For example, if no touch inputs have been detected for longer than thirty seconds, then the electronic device may return to a sleep mode where no content is presented on the display screen, or a low-energy display is displayed. When in the sleep mode or low-energy display, the electronic device may still monitor local audio for utterances of a wakeword for the device, albeit the device may not display any content thereon. In another embodiment, the displayed user interface may return to the first format in response to detecting another utterance. For example, in response to detecting an utterance, the electronic device may be configured to display the user interface in the first format. If an individual speaks the utterance to their electronic device, then this may indicate that the individual is no longer located proximate to the electronic device such that he/she may not be close enough to the electronic device to interact with the touch screen. Therefore, the electronic device may display the user interface in the first format, which may be configured for optimal viewing by the individual when he/she is not located proximate to the electronic device.

In some embodiments, the electronic device may be a sound controlled electronic device that also includes a touch screen. However, in other embodiments, the electronic device may include a touch screen capable of detecting touch inputs thereon, which may also include the functionality of a sound controlled electronic device such that it is capable of also functioning as a sound controlled electronic device. A sound controlled electronic device, as described herein, may correspond to any device capable of being activated in response to detection of a specific sound (e.g., a word, a phoneme, a phrase or grouping of words, or any other type of sound, or any series of temporally related sounds). For example, a voice activated electronic device is one type of sound controlled electronic device. Such voice activated electronic devices, for instance, are capable of generating and sending audio data to a backend system in response detecting a wakeword.

Spoken voice commands, in some embodiments, may be prefaced by a wakeword, which may also be referred to as a trigger expression, wake expression, or activation word. In response to detecting the wakeword being uttered, a voice activated electronic device may be configured to detect and interpret any words that subsequently follow the detected wakeword as actionable inputs or commands. In some embodiments, the voice activated electronic device may be activated by a phrase or grouping of words, which the voice activated electronic device may also be configured to detect. The voice activated electronic device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated electronic device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music." Further still, an utterance, which need not include the wakeword, may be, "Turn up the volume" or "Call mom."

A voice activated electronic device may monitor audio input data detected within its local environment using one or more microphones, transducers, or other audio input devices located on, or in communication with, the voice activated electronic device. The voice activated electronic device may, in some embodiments, then provide the audio data representing the detected audio input data to a backend system for processing and analyzing the audio data, and the backend system may then generate and sent a response to the voice activated electronic device. Additionally, the voice activated electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the backend system.

In some embodiments, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activate electronic device, which in turn may activate a burglar alarm.

In some embodiments, however, the electronic device may also be a manually activated electronic device that also includes a touch screen. A manually activated electronic device, as described herein, may correspond to a device that is capable of being activated in response to a manual input from an individual (e.g., pressing a button, touching a portion of a touch screen, performing an action on a device). For example, a tap-to-talk electronic device is one type of manually activated electronic device. Such tap-to-talk electronic devices, for instance, are capable of obtaining and outputting audio data in response to a button being pressed by an individual.

FIGS. 1A-C are illustrative diagrams of an electronic device presenting content on a display screen in a first format and a second format, in accordance with various embodiments. An individual 2 may, in some embodiments, speak a command to an electronic device 10, which may be located on a surface 6, as seen within FIG. 1A. Surface 6, for example, may correspond to a table, counter top, shelf, or any other substantially planar surface with which electronic device 10 may reside. In some embodiments, electronic device 10 may include a stand or support means such that electronic device 10 may remain upright, or substantially upright, on surface 6. In yet other embodiments, electronic device 10 may be mounted on a wall, or electronic device 10 may be mounted or housed within an object (e.g., on an outer surface of an appliance, a cabinet, etc.).

In some embodiments, electronic device 10 may be a sound controlled electronic device, such as a voice activated electronic device that also includes a touch screen, or touch display, as well as one or more additional input and/or output mechanisms. Electronic device 10 may, for example, monitor local audio for utterances of a wakeword, such as the name "Alexa." In response to detecting the wakeword, electronic device 10 may be configured to record audio of the subsequent speech, and may send audio data representing the speech to a backend system, such as backend system 100 of FIG. 2, for generating a response to the speech.

In some embodiments, individual 2 may utter a command prefaced by a wakeword, such as utterance 4, "Alexa—Show my playlists." In response to detecting the wakeword "Alexa," electronic device 10 may record audio of subsequent speech following the wakeword (e.g., a request "Show my playlist"), and may send audio data representing the request to a backend system, such as backend system 100, which is described in greater detail below with reference to FIG. 2. Backend system 100 may be configured to process, interpret, and/or analyze the audio data representing utterance 4, and may generate and send a response, such as display data representing user interface 20, to electronic device 10. The display data may correspond to content which may be presented on a touch or display screen of electronic device 10. The content, in some embodiments, may include a list of items, such as a list of playlists (e.g., lists of songs grouped by one or more parameters, such as genre or artist), which may be displayed on the display screen of electronic device 10. As an illustrative example, electronic device 10 may present user interface 20 on its display screen. User interface 20, in the illustrative embodiment, includes a first playlist item 22—"Alternative," a second playlist item 24—"Blues," a third playlist item 26—"Jazz," and a fourth playlist item 28—"Classic Rock." Persons of ordinary skill in the art will recognize that any type of list may be presented within user interface 20, and any number of items may be included within the list, and the use of four musical playlists within a list of playlists is merely exemplary.

In some embodiments, user interface 20 may be configured such that the various items displayed therein (e.g., playlist items 22-28) are optimally viewable from a certain distance. For example, playlist items 22-28 may be of a first font size and may have a first line spacing such that they are capable of being viewed by an individual located greater than an "arm's reach" from electronic device 10, which may correspond to approximately seven to ten feet from electronic device 10. The letters of playlist items 22-28 may, therefore, be of a substantially large font size, as well as being spaced apart so that they are easily viewable and readable by individuals located at such a distance from electronic device 10. In some embodiments, user interface 20 may be presented in a first format such that each of playlist items 22-28 are displayed in the first font size with the first line spacing. Furthermore, in the first format, user interface 20 may further present only a portion of the items of the list. For example, in response to receiving the audio data representing utterance 4, the backend system may send a list of all of the playlists associated with a user account of individual 2 (or an individual associated with electronic device 10). However, due to the font size and line spacing parameters of the first format, only a subset of the total content may be displayable within the user interface. For instance, if the user account has more than four playlists, then while display data representing all of the playlists may be sent to electronic device 10, only some of the playlists (e.g., a first four playlists) may be presented within user interface 20, and some of the playlists may not be presented within user interface 20.

"Sentence spacing," in some embodiments, may correspond to an amount of horizontal space that may be used for a line typing. For example, a horizontal spacing of a character that may be typed or printed may vary depending on that character's form. As there may only be a certain amount of spacing on a horizontal line of type, the line spacing may set an amount of characters that may be included on that horizontal line, along with an appropriate spacing there between, to optimally fit, based on a user's preference. For example, line spacing may be 2-5 pixels, however this is merely exemplary. "Line spacing," in some embodiments, may correspond to an amount of vertical space that may be used to separate to horizontal lines of typing. For example, the vertical spacing of a character may also vary depending on the particular character. For instance, a "j" may have an upper vertical height that is substantially similar to the letter, "o," however a lower vertical of the "j" may differ from the "o." In some embodiments, the line spacing may be set at some ratio of the spacing between the maximum upper height of one line and a minimum lower height of another line. As an illustrative embodiment, "one" line spacing may correspond to one character (e.g., approximately 10-15 pixels) separation between the first line and the second line. As another example, "one and a half" line spacing and "double" line spacing may correspond to one and a half characters (e.g., 15-22.5 pixels) separation and two character separation (e.g., 20-30 pixels). However, person of ordinary skill in the art will recognize that the aforementioned is merely exemplary.

In some embodiments, individual 2 may decide, or desire, to view one or more additional items, or individual 2 may decide to select, or find out more information related to, one or more items displayed on user interface 20. In this particular instance, individual 20 may perform one or more touch-based gestures on the display screen of electronic device 10. In some embodiments, the display screen of electronic device 10 may be a touch screen, such as a capacitive sensing display interface. As an illustrative example, individual 20 may approach electronic device 10 and may contact a touch screen of electronic device 10 at a first location 14 using a finger 12 of their hand 8, as seen within FIG. 1B. Although FIG. 1B shows individual 2 contacting the touch screen with finger 12, persons of ordinary skill in the art will recognize that any suitable object may be used to contact the touch screen including, but not limited to, one or more fingers, a palm of hand 8, a pen or stylus capable of interacting with a touch screen, a glove or other article of clothing including conductive particulates, or any other object, or any combination thereof. Furthermore, in some embodiments, an individual may be capable of performing a hovering type gesture, where the individual may bring one or more objects, such as a finger, hand, or styles, within a close distance (e.g., a few millimeters to a few centimeters) of the touch screen. The touch screen may, for instance, be capable of detecting deformations in the electric field due to the presence of the object(s), even though the objects may not be touching the touch screen, and may be capable of registering these actions as an input. For example, an individual may wave their hand about the touch screen, which may cause a substantially same action to occur as if the individual performed a touch-based swipe gesture.

Finger 12 may, as mentioned above, contact the touch screen presenting user interface 20 at first location 14. First location 14 may correspond to a particular horizontal position and vertical position on the touch screen. For instance, if the touch screen were viewed as a two-dimensional grid, were the x-direction corresponds to a horizontal axis of the touch screen and the y-direction corresponds to a vertical axis of the touch screen, then first location 14 may correspond to a point P1, associated with a horizontal position X1 and a vertical position Y1 (e.g., P1=(X1, Y1). Any suitable touch gesture may be performed by individual 2 on the touch screen, including, but not limited to, a tap, a swipe, a scroll, a flick, a fling, a lasso, a pinch, or any other touch gesture, or any combination thereof. Furthermore, non-touch proximity gestures may also be capable of being performed, including a wave, a hover, or any other type of gesture where contact with the touch screen may not directly occur. In some embodiments, a determination may be made that finger 12 has been in contact with the touch screen at first location 14 for more than a predefined time period associated with non-tap gestures. For instance, a tap gesture may correspond to a relative fast touch and release motion, therefore contact with the touch screen would have a relatively small temporal duration (e.g., half a second). If finger 12 contacts the touch screen at first location 14 for longer than the time period associated with tap gestures, then electronic device 10 may determine that a non-tap gesture is being performed.

In some embodiments, one or more items from the list, may also be located along the same vertical and/or horizontal position as the first location. For example, playlist item 26 may be located along a same horizontal line and at a same vertical position on the touch screen as first location 14. In other words, characters of playlist item 26 may be located at position Y1, which may be the same vertical position as point P1. In response to determining that the gesture currently being performed by finger 12 is a non-tap gesture, electronic device 10 may determine that playlist item 26 is located at the same vertical position Y1 as first location 14, and may be configured to select playlist item 26. In some embodiments, when a particular item is selected, that item may become highlighted, grayed out, or may be modified in any suitable fashion to indicate that the item has been selected. For example, although not shown within user interface 20, playlist item 26 may be highlighted in response to individual 2 contacting the touch screen at first location 14.

In some embodiments, individual 2 may perform a scroll gesture using finger 12 on the touch screen. For example, a scroll or swipe gesture may be performed by individual 2 by having finger 12 maintain contact with the touch screen while having finger 12 move from first location 14 to a second location 34, as seen in FIG. 1C. The movement of finger 12 from first location 14 to second location 34 may be performed at any suitable speed so long as contact with the touch screen is maintained throughout the duration of the scroll gesture. For example, a temporal duration from when finger 12 is located at first location 14 to when finger 12 is located at second location 34 may be relatively small (e.g., a few milliseconds), or large (e.g., one or two seconds), however this is merely exemplary. Furthermore, in some embodiments, different actions may be associated with a touch gesture depending on a temporal duration of finger 12 moving from first location 14 to second location 34. In one exemplary embodiment, second location 34 may be located substantially vertically above or below first location 14 (e.g., along a two-dimensional plane of the touch screen), or second location 34 may be located substantially horizontally to the left or right of first location 14, however persons of ordinary skill in the art will recognize that this is merely exemplary. As an illustrative example, second location 34 may correspond to a point P2, having a same horizontal position X1 as that of point P1 associated with first location 34, however point P2 may have a different vertical position Y2 (e.g., point P2=(X1, Y2)).

In one exemplary embodiment, electronic device 10 may be configured to present a second user interface 30, or may be configured to present user interface 30, as seen within FIG. 1C, in a second format (e.g., user interface 20 modified to be in a second format), in response to detecting the scroll gesture being performed on the touch screen of electronic device 10. Second user interface 30 may be configured such that the items within the list, such as playlist items 22-28, are now displayed in the second format. For instance, a font size of the characters of playlist items 22-28 may be reduced, and a line spacing between each line of playlist items 22-28 may also be reduced. As an illustrative example, a reduction factor of 1.5 or 2.0 may be used to reduce the font size and line spacing of the items of the list. In this particular scenario, items presented within first user interface 20 may one and a half to two times larger than items presented within second user interface 30, and a line spacing between the items within first user interface 20 may be one and a half to two times larger than a line spacing between the items within second user interface 30. This may allow second user interface 30 to be viewed at a closer distance, such as a one to three feet away from electronic device 10, or within "arm's reach" of electronic device 10. This may be due to electronic device 10 determining that individual 2 likely is not located at a far distance (e.g., seven to ten feet) from electronic device 10 because an interaction with the touch screen of electronic device 10 has occurred, and therefore keeping first user interface 20 presented, which was configured to viewing at a larger distance away from electronic device 10, may be not provide an optimal viewing experience. Therefore, upon detecting the touch gesture (e.g., a scroll or swipe gesture), electronic device 10 may display second user interface 30, which may be optimally viewable from a closer distance, such as one to three feet away.

In some embodiments, one or more additional items from the list may be displayed within second user interface 30. As mentioned previously, there may be more than four playlist items associated with a user account of individual 2, and not all of the playlist items may have been viewable within first user interface 20 due to first user interface 20 presenting the playlist items having the first font size and the first line spacing. However, in second user interface 30, the playlist items may be displayed in the second, smaller, font size with the second, smaller line spacing, and therefore additional playlist items may be capable of being presented within second user interface 30. As an illustrative example, second user interface 30 may include additional playlist item 32, which previously was not viewable within first user interface 20. Persons of ordinary skill in the art will recognize that although only one additional item is presented within second user interface 30, any number of additional items may be included therein. Therefore, instead of displaying four playlist items, as was the case with user interface 20, five playlist items may now be presented within user interface 30. This may allow individual to have an increased number of playlist items with which to choose from.

In some embodiments, when the swipe or scroll gesture is performed, the selected item (e.g., playlist item 26), may also be moved from a first position associated with the first vertical position of first location 14 to a second position associated with a second vertical position of second location 34. For example, as mentioned previously, first location 14 may correspond to a point P1 having first horizontal position X1 and first vertical position Y1, and playlist item 26 may be displayed along a horizontal line at first vertical position Y1. Thus, when finger 12 moves from first location 14 to second location 34, corresponding to point P2 having first horizontal position X1 and second vertical position Y2, playlist item 26 may also move to a horizontal line at second vertical position Y2. This may enable playlist item 26 to remain "in-line" with finger 12 as finger 12 moves from first location 14 to second location 34. By keeping the positioning of playlist item 26 in-line with the position of finger 12, the eyes of individual 2 will not need to readjust, as each of the playlist items displayed within first user interface 20 will appear to shrink around first location 14.

FIG. 2A is an illustrative diagram of an electronic device in communication with a backend system, in accordance with various embodiments. Electronic device 10, in some embodiments, may correspond to a voice activated electronic device including a touch screen or other touch sensing circuitry. Electronic device 10 may be configured such that it may communicate with a backend system 100 in response to electronic device 10 detecting an utterance of a wakeword subsequently followed by a request/question/statement. Electronic device 10 may also be configured, in one embodiment, to communication with backend system 100 in response to a manual input being detected by one or more input mechanisms on electronic device 10, such as a touch screen, a button, or a switch.

Electronic device 10, in some embodiments, may correspond to any type of electronic device capable of being activated in response to detecting a specific sound, such as a wakeword, as well as, or alternatively, via one or more inputs. In one non-limiting embodiment, after detecting a specific sound (e.g., a wakeword or trigger), electronic device 10 may recognize commands (e.g., audible commands, inputs) within captured audio, and may perform one or more actions in response to the received commands. Furthermore, electronic device 10 may also be configured to perform one or more actions in response to detecting a particular touch, or mechanical, input(s). Electronic device 10 may correspond to any suitable type of electronic device including, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, electronic device 10 may be relatively simple or basic in structure such that no mechanical input option(s) (e.g., keyboard, mouse, track pad) or touch input(s) (e.g., touch screen, buttons) may be provided. For example, electronic device 10 may be able to receive and output audio, and may include power, processing capabilities, storage/memory capabilities, and communication capabilities. However, in other embodiments, electronic device 10 may include one or more mechanical inputs or touch inputs, such as a touch screen or touch screens and/or one or more buttons.

Electronic device 10 may include a minimal number of input mechanisms, such as a power on/off switch, however primary functionality, in one embodiment, of electronic device 10 may solely be through audio input and audio output. For example, electronic device 10 may listen for a wakeword by continually monitoring local audio. In response to the wakeword being detected, electronic device 10 may establish a connection with backend system 100, send audio data to backend system 100, and await/receive a response from backend system 100. In some embodiments, however, non-voice activated devices may also communicate with backend system 100 (e.g., push-to-talk devices). For example, in response to a button or touch screen being pressed, or a button or touch screen being pressed and held, electronic device 10 may begin recording local audio, and may establish a connection with backend system 100, send audio data representing the captured audio to backend system 100, and await/receive a response from backend system 100.

Electronic device 10 may include one or more processors 202, storage/memory 204, communications circuitry 206, one or more microphones 208 or other audio input devices (e.g., transducers), one or more speakers 210 or other audio output devices, a display 212, and one or more cameras 214 or other image capturing components. However, one or more additional components may be included within electronic device 10, and/or one or more components may be omitted. For example, electronic device 10 may include a power supply or a bus connector. As another example, electronic device 10 may not include camera(s) 214. As still yet another example, electronic device 10 may include one or more additional input and/or output mechanisms, such as one or more buttons, or one or more switches or knobs. Furthermore, while multiple instances of one or more components may be included within electronic device 10, for simplicity only one of each component has been shown.

In some embodiments, electronic device 10 of FIG. 2 may correspond to a manually activated electronic device, or may include the functionality of a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk electronic device is one type of manually activated electronic device. Such tap-to-talk electronic devices, for instance, are capable of obtaining and outputting audio data in response to a button being pressed by an individual.

Processor(s) 202 may include any suitable processing circuitry capable of controlling operations and functionality of electronic device 10, as well as facilitating communications between various components within electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to backend system 100 for processing.

The wakeword database may be a database stored locally on electronic device 10 that includes a list of a current wakeword for electronic device 10, as well as one or more previously used, or alternative, wakewords for voice activated electronic device. In some embodiments, an individual may set or program a wakeword for their electronic device 10. The wakeword may be programmed directly on electronic device 10, or a wakeword or words may be set by the individual via a backend system application that is in communication with backend system 100. For example, an individual may use their mobile device having the backend system application running thereon to set the wakeword. The specific wakeword may then be communicated from the mobile device to backend system 100, which in turn may send/notify electronic device 10 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 10. In this way, if a particular sound (e.g., a wakeword or phrase) is detected by electronic device 10, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally, a portion of an audio signal is analyzed by comparing its MINI model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 10 may then begin transmitting the audio signal to backend system 100 for detecting and responds to subsequent utterances made by an individual or by an electronic device (e.g., television 20).

Communications circuitry 206 may include any circuitry allowing or enabling electronic device 10 to communicate with one or more devices, servers, and/or systems. For example, communications circuitry 206 may facilitate communications between electronic device 10 and backend system 100. As an illustrative example, audio data representing command 4 may be transmitted over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between electronic device 10 and backend system 100. In some embodiments, electronic device 10 and backend system 100 may communicate with one another via a web browser using HTTP. Various additional communication protocols may be used to facilitate communications between electronic device 10 and backend system 100 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 10 may include an antenna to facilitate wireless communications with a network using various wireless technologies (e.g., Wi-Fi, Bluetooth®, radiofrequency, etc.). In yet another embodiment, electronic device 10 may include one or more universal serial bus ("USB") ports, one or more Ethernet or broadband ports, and/or any other type of hardwire access port so that communications circuitry 206 allows electronic device 10 to communicate with one or more communications networks.

Electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 10 may include multiple microphones (e.g., four, seven, ten, etc.) placed at various positions about electronic device 10 to monitor/capture any audio outputted in the environment where electronic device 10 is located. The various microphones 208 may include some microphones optimized for distant sounds, while some microphones may be optimized for sounds occurring within a close range of electronic device 10. In some embodiments, microphone(s) 208 may only begin to detect audio signals in response to a manual input to device 10. For example, a manually activated electronic device may begin to capture audio data in response to a user input, such as pressing a button, tapping a touch screen, or providing any touch input gesture to a touch input component.

Electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where electronic device 10 may be located. In some embodiments, speaker(s) 210 may include headphones or ear buds, which may be wirelessly wired, or hard-wired, to electronic device 10, that may be capable of broadcasting audio directly to an individual.

In some embodiments, one or more microphones 208 may serve as input devices to receive audio inputs, such as command 4. Electronic device 10, in the previously mentioned embodiment, may then also include one or more speakers 210 to output audible responses. In this manner, electronic device 10 may function solely through speech or audio, without the use or need for any input mechanisms or displays.

Display 212 may correspond to a display screen and/or touch screen, which may be any size and/or shape and may be located at any portion of electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon. For instance, display 212 may correspond to a projected capacitive touch ("PCT"), screen include one or more row traces and/or driving line traces, as well as one or more column traces and/or sensing lines.

Figure 2B:
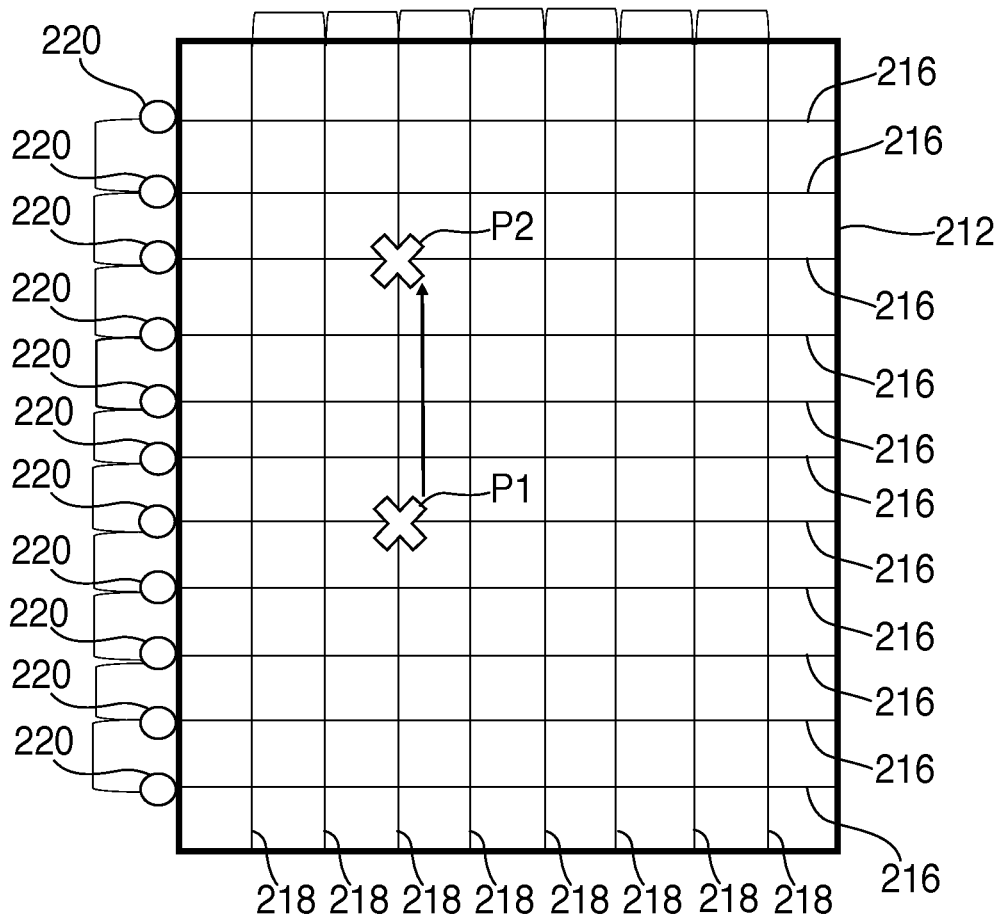
FIGS. 2B and 2C are illustrative top and cross-sectional views, respectively, of a display of the electronic device of FIG. 2A, in accordance with various embodiments.
Figure 2C:
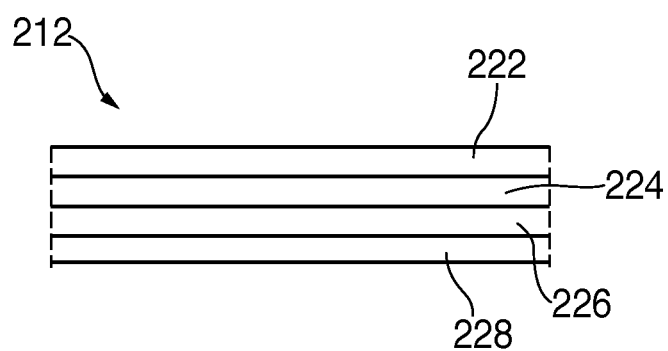

FIGS. 2B and 2C are illustrative top and cross-sectional views, respectively, of a display of the electronic device of FIG. 2A, in accordance with various embodiments. Display 212 of FIG. 2C, in one non-limiting embodiment, may include an insulator portion 228, such as glass, coated with a transparent conductor 222, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display 212, a capacitance between the object and the conductive material may be formed. Processor(s) 202 may be capable of determining a location of the touch screen associated with where the capacitance change is detected, and may register a touch input as occurring at that location.

In some embodiments, display 212 may include multiple layers, such as a top coating layer 222, a driving line layer 224, a sensing layer 226, and a glass substrate layer 228. As mentioned previously, the glass substrate layer 228 may correspond to an insulator portion, while top coating layer 222 may be coated with one or more conductive materials. Driving line layer 224 may include a number of driving lines 218, and sensing layer 226 may include a number of sensing lines 216, which are described in greater detail below. Persons of ordinary skill in the art will recognize that one or more additional layers, or spaces between layers 222-228, may be included within display 222. Furthermore, persons of ordinary skill in the art will recognize that any number of driving lines and sensing lines for driving line layer 224 and sensing layer 226, respectively, may be used.

In some embodiments, driving lines 218 and sensing lines 216 of driving line layer 224 and sensing line layer 226, respectively, may form a number of intersection points, where each intersection functions as its own capacitor. Each sensing line 216 may be coupled to a source 220, such that a charge is provided to each sensing line 216, and changes in capacitance of a particular driving line 218 and sensing line 216 are detectable thereby. In response to a conductive object being brought proximate, or substantially touching an outer surface of top coating layer 222, for instance at a point P1, a mutual capacitance of a particular capacitor (e.g., an intersection point) may reduce in magnitude. In other words, a voltage drop may be detected at a location on display 212 corresponding to where a conductive object contacted display 212.

A change in capacitance may be measured to determine a location on the touch screen where the object has contacted the surface. For example, if an individual touches point P1 on display 212, then a corresponding driving line 216 and sensing line 218 that intersect at point P1 may be identified. A location of point P1 may, for instance, correspond to a horizontal position X1 and a vertical position Y1 on display 212. This location may also have one or more pixels associated with that location, and therefore one or more actions may be registered for an item or items that are displayed at that location. Electronic device 10 may be configured to determine which pixels are associated with a particular location point, and which item or items are also displayed at that pixel location. Furthermore, electronic device 10 may be configured to cause one or more additional actions to occur to the item or items being displayed on display 212 based on a temporal duration the touch input, and or if one or more additional touch inputs are detected. For example, an object that contacted display 212 at location P1 may be determined, at a later point in time, to contact display 212 at location P2. In the illustrative example, an object may have initially contacted display at point P1, and moved along a particular driving line 218 to point P2. In this scenario, a same driving line 218 may have detected a change in capacitance between points P1 and P2, corresponding to two separate sensing lines 216.

The number of driving lines 218 and sensing lines 216, and therefore the number of intersection points, may directly correlate to a "resolution" of a touch screen. For instance, the greater the number of intersection points (e.g., a greater number of driving lines 218 and sensing lines 216), the greater precision of the touch input. For instance, a touch screen display 212 having 100 driving lines and 100 sensing lines may have 100 intersection points, and therefore 100 individual capacitors, while a touch screen display 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because driving lines 218 and sensing lines 216 require a voltage to be applied to them, this may also mean that there is a larger power draw by electronic device 10, and therefore the fewer driving lines 218 and/or sensing lines 216, the smaller the power needed to operate the touch screen display.

In some embodiments, display 212 may correspond to a high-definition ("HD") display. For example, display 212 may display images and/or videos of 720p, 1080p, 1080i, or any other image resolution. In these particular scenarios, display 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 by 1080 image having 2,073,600 pixels. However, persons of ordinary skill in the art will recognize that the aforementioned display ratios and pixel numbers are merely exemplary, and any suitable display resolution or pixel number may be employed for display 212, such as non-HD displays, 4K displays, and/or ultra displays.

Returning to FIG. 2A, camera(s) 214 may correspond to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 10 may include multiple cameras 214, such as one or more front-facing cameras and/or one or more rear facing cameras. Camera(s) 214, furthermore, may be configured to recognize far-field imagery (e.g., objects located at a large distance away from electronic device 10) or near-filed imagery (e.g., objected located at a relatively small distance from electronic device 10). In some embodiments, camera(s) 214 may be high-definition ("HD") cameras, capable of obtaining images and/or videos at a substantially large resolution (e.g., 726p, 1080p, 1080i, etc.). In some embodiments, camera(s) 214 may be external to electronic device 10. For instance, an external camera may be capable of capturing images and/or video, which may then be provided to electronic device 10 for viewing and/or processing.

In one exemplary embodiment, electronic device 10 may include an additional input/output ("I/O") interface. For example, electronic device 10 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 10 may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 10. For example, one or more LED lights may be included on electronic device 10 such that, when microphone(s) 208 receive audio, the one or more LED lights become illuminated signifying that audio has been received by electronic device 10. In some embodiments, one or more vibrating mechanisms or other haptic features may be included with electronic device 10 to provide a haptic response to an individual from device 10.

Backend system 100 may, in some embodiments, be a remote device capable of receiving and sending content from one or more electronic device, such as electronic device 10. Backend system 100 may include various components and modules including, but not limited to, automatic speech recognition ("ASR") module 258, natural language understanding ("NLU") module 260, subject matter servers/skills module 262, text-to-speech ("TTS") module 264, and user accounts module 268. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as a speaker identification ("ID") module, or any other module, or any combination thereof.

ASR module 258 may be configured to recognize human speech in detected audio, such as audio captured by electronic device 10, which may then be transmitted to backend system 100. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 258 may include an expression detector that analyzes audio signals received by backend system 100, such as the expression detector mentioned above with regards to electronic device 10. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

NLU module 260 may be configured such that it determines user intent based on the received audio data. For example, NLU module 260 may determine that the intent of command 4 is for traffic information. In response to determining the intent of command 4, NLU module 260 may communicate the received command to an appropriate subject matter server or skill on subject matter servers/skills module 262 to perform one or more tasks, and/or retrieve an appropriate response or response information. NLU module 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

Subject matter servers/skills module 262 may, for example, correspond to various action specific skills or servers capable of processing various task specific actions. Subject matter servers/skills module 262 may further correspond to first party applications and/or third party applications capable of performing various tasks or actions. For example, based on the context of the audio received from electronic device 10, backend system 100 may use a certain application to generate a response, or to obtain response information, which in turn may be communicated back to electronic device 10. For instance, command 4 may ask for the traffic information, and therefore subject matter servers/skills module 262 may access a traffic subject matter server to obtain current traffic patterns and traffic information for a location associated with electronic device 10. Subject matter servers/skills module 262 may also include processor(s) 252, storage/memory 254, and communications circuitry 256.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 268 may store one or more user profiles corresponding to users having a registered account on backend system 100. For example, a parent may have a registered account on backend system 100, and each of the parent's children may have their own user profile registered under the parent's registered account. Information, settings, and/or preferences, for example, for each user profile may be stored within a user profile database. In some embodiments, user accounts module 268 may store a voice signal, such as voice biometric information, for a specific user profile. This may allow speaker identification techniques to be used to match a voice to voice biometric data associated with a specific user profile. In some embodiments, user accounts module 268 may store a telephone number assigned to a particular user profile.

In some embodiments, one or more content items, such as playlist items 22-32 of FIGS. 1A-C, may be stored within a particular individual's user account. Therefore, in response to receiving a request to view certain content, backend system 100 may access that content from within an individual's particular user account. Furthermore, backend system 100 may also be configured to generate display data representing a user interface, or multiple user interfaces each in different formats, to be provided to electronic device 10 in response to a command. For example, in response to receiving command 4, backend system 100 may access user accounts module 268 to obtain playlist items. Then, backend system may, using a display skill within category servers/skills module 262, generate display data representing the user interface(s), and may send the display data to electronic device 10. However, in some embodiments, a separate user interface module may be included within backend system 100, which may be configured to generate user interfaces for electronic device 10, and may generate and send display data representing those user interfaces to electronic device 10.

Persons of ordinary skill in the art will recognize that although each of ASR module 258, NLU module 260, subject matter/skills module 262, TTS module 264, user accounts module 268, sound profile database 270, and sound profile generation module 272 may each include instances of processor(s) 252, storage/memory 254, and communications circuitry 256, and those instances of processor(s) 252, storage/memory 254, and communications circuitry 256 within each of ASR module 258, NLU module 260, subject matter servers/skills module 262, TTS module 264, user accounts module 268, sound profile database 270, and sound profile generation module 272 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

FIGS. 3A and 3B are illustrative diagrams of a user interface being presented in a first format and a second format, respectively, in response to a scrolling gesture, in accordance with various embodiments. FIG. 3A, in the illustrative, non-limiting embodiment, includes electronic device 10, which may display a user interface 300 thereon in a first format. User interface 300 may be displayed on a touch screen, such as display 212, of electronic device 10. In some embodiments, touch screen display 212 may be located on a front side of electronic device 10, and camera 214 may also be located on the front side. For instance, camera 214 may be located on an upper portion of the front side of electronic device 10, substantially above display 212 presenting user interface 300 thereon, however this is merely exemplary, and camera 214 may be located at any suitable location on electronic device 10.

User interface 300 may display, in one embodiment, a list of items, such as a "To Do List." In the illustrative embodiment, a title or header 302 may be displayed on an upper portion of user interface 300, and one or more items of the list may be displayed below title 302. For example, a first item 304 of the list may be displayed on a first line, and a second item 306 of the list may be displayed on a second line. The first line and the second line, as referred to in this example, may correspond to various pixels each having a same vertical position about display 212. For example first item 304 may be located along a first horizontal line associated with a first vertical position on display 212, while second item 306 may be located along a second horizontal line associated with a second vertical position on display 212. First item 304 and second item 306 may be displayed having a first font size F1 may be large enough that first user interface 300 is clearly viewable from a first distance. For example, first font size F1 may be of a size that is large enough such that title 302, first item 304, and second item 306 are viewable by an individual located approximately seven to ten feet away from electronic device 10. Furthermore, the first line and the second line, having first item 304 and second item 306 displayed thereon, respectively, may be separated by a first line spacing D1. First line spacing D1 may be large enough so that, from the first distance, first item 304 and second item 306 do not appear to overlap, and are clearly distinguishable from one another.

In some embodiments, first font size F1 and first line spacing D1 may be set such that some characters of the items displayed within first user interface 300 do not all fit on display 212. For example, second item 306 may read "Pick Up Dry Cleaning." However, due to font size F1 of second item 306, the word "Cleaning" may not be able to fit on the second line, and may instead be located on a third line beneath the words "Pick Up Dry." In some embodiments, however, the full text of second item 306 may be, "Pick Up Dry Cleaning," however due to first font size F1 and/or first line spacing D1, the last word, "Cleaning," may not be able to fit on the second line, and therefore may not be viewable on first user interface 300. Persons of ordinary skill in the art will recognize that although only two items of a list are displayed within first user interface 300, any suitable number of items of a list may be displayed therein such that each item is viewable from a first distance from electronic device 10. Furthermore, in some embodiments, first font size F1 and first line spacing D1 may be configurable such that an individual operating electronic device 10 may modify or adjust first font size F1 and/or first line spacing D1.

In some embodiments, an individual, such as individual 2, may scroll through the items of the list and/or modify one or more items on the list. To do this, individual 2 may provide a touch input, such as a scroll gesture, to display 212. As an illustrative example, individual 2 may contact an outer surface (e.g., a surface facing outwards from electronic device 10) of display 212, which may currently be displaying user interface 300. In some embodiments, an object, such as finger 8 of individual 2, may contact display 212 at a first location 310. As mentioned above, display 212 may be a touch screen including one or more driving and sensing lines (e.g., driving lines 218 and sensing lines 216). Upon detecting a change in the capacitance at intersection point of the driving and sensing lines, processor(s) 202 of electronic device 10 may determine a portion of a pixel array of display 212 that is associated with first location 310, and may also determine if one or more content items are currently displayed within that portion of display 212. For example, first location 310 may be associated with a particular horizontal position (e.g., horizontal position X1) and vertical position (e.g., vertical position Y1) of display 212. Electronic device 10 may also determine that second item 306, which also may be displayed within first user interface 300, is also located at the same vertical position (e.g., vertical position Y1) but at a different horizontal position. In other words, the second line where second item 306 is being displayed within first user interface 300 may correspond to a same horizontal sensing line as that of first location 310.

In some embodiments, second item 306 may be selected in response to electronic device 10 determining that contact with display 212 about first location 310 is associated a selection of second item 306. Electronic device 100 may, in response to detecting the touch input, determine that second item 306 is located along a same vertical position, and may determine a likelihood value that the touch input corresponds to a selection of second item 306. If the likelihood value is determined to be greater than a predefined touch input threshold value, then electronic device 10 may be configured to select second item 306. For example, if no other items are displayed near location 310, and second item 306 is the closest or most probable item that the touch input corresponds to, then electronic device 10 may select second item 306. In some embodiments, an item that is selected may become highlighted, shaded, boxed, grayed-out, or modifying in any suitable manner to signify its selection. For instance, in the illustrative embodiment, dashed box 308 may appear about second item 306 to indicate that a selection of second item 306 has occurred.

In some embodiments, an individual may perform a swipe or scrolling gesture on touch screen display 212 presenting first user interface 300. For example, individual 2 may contact display 212 at a first location 310 using finger 8, and while remaining in contact with display 212, may move finger 8 in direction A1. Electronic device 10 may be capable of determining a type of gesture being performed to display 212 based on a variety of factors. For instance, electronic device 10 may be capable of determining that the gesture is a non-tap gesture by determining that the object has remained in contact with display 212 for more than a predefined temporal duration. A tap gesture may be a relatively quick gesture, and therefore if contact with display 212 is determined to last longer than the predefined temporal duration (e.g., the capacitance change at an intersection point of a particular driving line and sensing line lasts continues for more than the predefined temporal duration), then that may indicate that the gesture is a non-tap gesture. Furthermore, electronic device 10 may also determine that, in addition to the object remaining in contact with display 212, the object also moved from location 310 to location 360. For example, location 310 may be associated with a first intersection of driving lines and sensing lines, and location 360 may be associated with a second intersection of driving lines and sensing lines. A directionality and velocity of the movement may be determined based on a difference in the horizontal and vertical positions of locations 360 and 310, as well as a temporal difference between a first time when contact with location 310 ended, and a second time when contact with location 360 began.

In response to determining that a scrolling gesture has been performed, electronic device 10 may present user interface 350 on display 212. Second user interface 350 may be substantially similar to user interface 300, such that user interface 350 may correspond to user interface 300 being displayed in a second format. In some embodiments, based on determining that the scrolling gesture has been performed, electronic device 10 may determine that an individual is located substantially near (e.g., one to three feet) electronic device 10, and may cause user interface 350 to be presented on display 212. User interface 350 may be arranged so that it is optimally viewable by an individual (e.g., individual 2) from a position that may be substantially near electronic device 10. For instance, user interface 300 may have been configured such that it was optimally viewable from afar, such as seven to ten feet away from electronic device 10. However, this may not be a preferable viewing scheme for an individual located close to electronic device 10 (e.g., within one to three feet of display 212). Therefore, user interface 350 may be configured so that it is easily viewable by an individual located close to electronic device 10.

In some embodiments, user interface 350 may include title 352, first item 354, second item 356, third item 362, and fourth item 364. Title 352, first item 354, and second item 356 may be substantially similar to title 302, first item 304, and second item 306, with the exception that the former may be displayed in a smaller font size and with reduced spacing between each item's lines so that user interface 350 is more easily viewed from a close proximity. For example, items 354, 356, 362, and 364 may be displayed in a second font size F2, which may be smaller than first font size F1, which may make close-up reading and navigation of the list of items easier. First item 352, second item 354, third item 362, and fourth item 364 may be displayed on a first line, second line, third line, and fourth line, respectively. In some embodiments, a second line spacing D2 may be used within user interface 350 such that each item is displayed closer to one another. Furthermore, title 352 may be moved to a higher (e.g., a greater vertical position) within user interface 350, however this is merely exemplary as title 352 may also remain in a substantially same location within user interface 350 as it was within user interface 300.

In some embodiments, as individual 2 performs the scroll gesture in direction A1, finger 8 may move across display 212 from first location 310 to second location 360. As finger 8 moves from first location 310 to second location 360, second item 306 may move with finger 8, such that a position of the second line about display 212 for second item 352 within user interface 350 is in-line with a vertical position of second location 360. For example, if second location 360 is located at a vertical position Y2, then second item 352 within user interface 350 would also be presented at vertical position Y2, albeit at a different horizontal position. This may provide individual 2 with the apparent feeling as though the list of items is shrinking or collapsing about location 310 where they contacted display 212, as opposed to just appearing to reduce in font size and line spacing. Furthermore, dashed box 308, which indicated that second item 306 was selected, may also reduce in size, as dashed box 358 may be displayed within user interface 350. Dashed box 358 may therefore still indicate that second item 356 is selected, however it may be of a different sizing to conform with the configuration of second item 356 within user interface 350.

In some embodiments, second font size F2 and second line spacing D2 of user interface 350 may enable more items to be displayed within the list as compared to user interface 300. For instance, additional items may be able to be displayed within user interface 350 in the second format. For example, third item 362 and fourth item 364 may be displayed within user interface 350, but where not able to be displayed within user interface 300 due to first font size F1 and/or first line spacing D1. Due to the reduced font size F2 and line spacing D2, items 362 and 364 may now be able to be displayed within user interface 350, providing an individual with a greater number of viewing options and increasing an amount of information presented to the individual.

Figure 4:
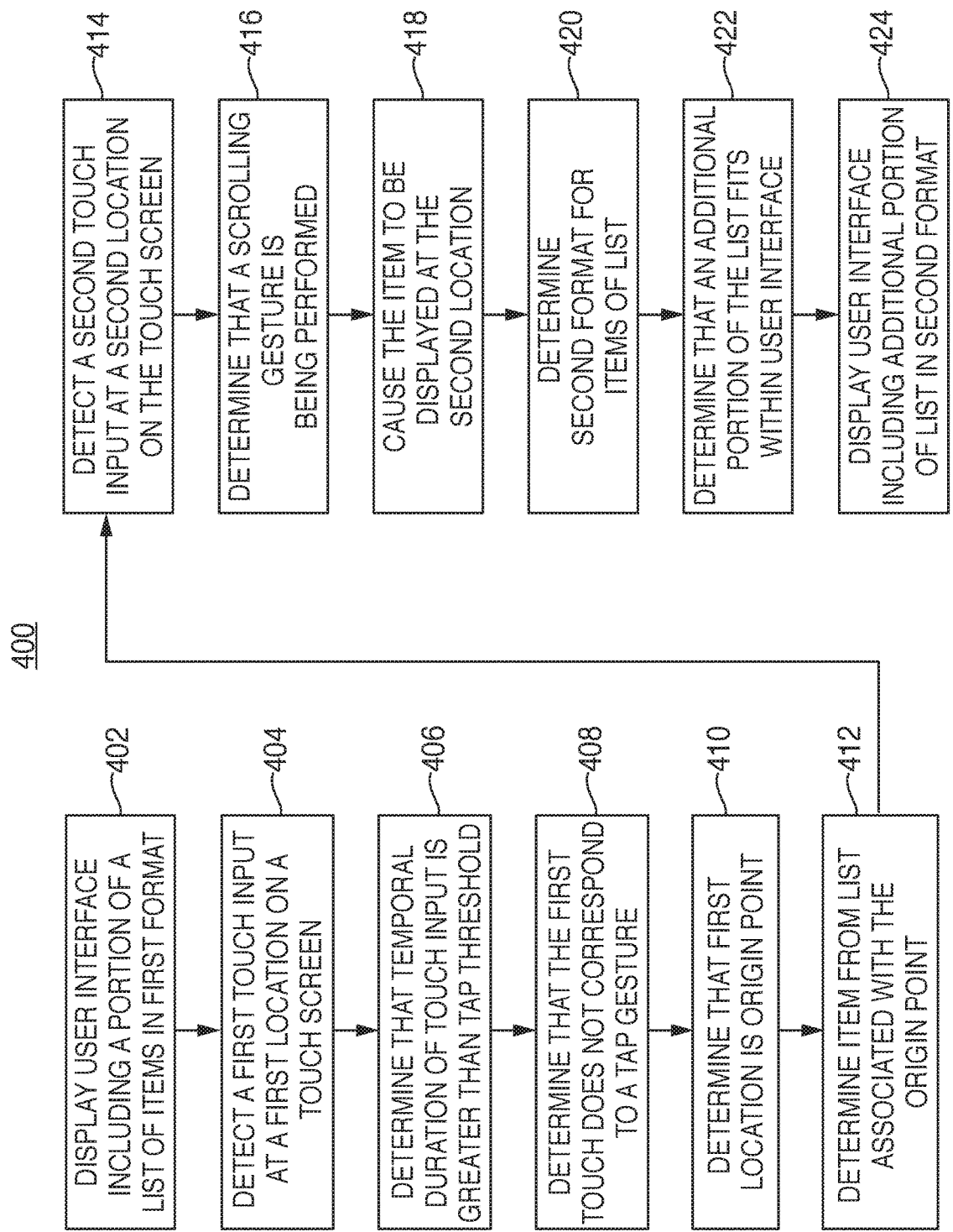
FIG. 4 is an illustrative flowchart of a process for presenting a user interface in a first format and a second format, in accordance with various embodiments.

FIG. 4 is an illustrative flowchart of a process for presenting a user interface in a first format and a second format, in accordance with various embodiments. Process 400, in one embodiment, may begin at step 402. At step 402, a user interface including a portion of a list of items may be present in a first format. For example, user interface 300 of FIG. 3 may be presented in a first format on a display of electronic device 10. In some embodiments, user interface 300 may present content such that the content is optimally viewable from a first distance (e.g., seven to ten feet) from electronic device 10. For example, items 306 and 308 may be displaying having first font size F1 and first line spacing D1.

At step 404, a first touch input may be detected at a first location of the touch screen presenting the user interface. For example, electronic device 10 may determine that an object has contacted touch screen display 212 at first location 310. For instance, a change in a capacitance between a surface and one or more driving lines 218 and one or more sensing lines 216 of display 212 may be detected. At step 406, a determination may be made that a temporal duration of the first touch input is greater than a predefined tap gesture threshold, and at step 408 it may be determined that the first touch input corresponds to a non-tap gesture. For example, a tap gesture may be associated with substantially quick touch of display 212, and therefore if contact with display 212 lasts for longer than a predefined tap gesture threshold, then the first touch input likely corresponds to a non-tap gesture.

At step 410, a determination may be made that the first location is an origin point for the first touch input. For example, first location 310 may correspond to an origin point for a scrolling gesture. The origin point may be used, in some embodiments, to determine a velocity, or displacement, of a gesture that is being performed on the touch screen. For example, a velocity of a scroll gesture, indicating how fast to scroll or how much to zoom-in, may be determined based on an origin point, an end point, and a temporal duration associated with going from the origin point to the end point.

At step 412, an item from the list of items presented within the first user interface may be determined to be associated with the origin point. The origin point, or first location, may correspond to a particular intersection point of a driving line 218 and sensing line 216 of a capacitive cell touch screen. The intersection point may be related to a portion of the displayed user interface, for instance, a horizontal and vertical position of display 212. In some embodiments, one or more items may be displayed at, or substantially at, the horizontal and/or vertical positions. For example, second item 306 may be displayed along a horizontal line located at the same vertical position (e.g., Y2) of the intersection point. Therefore, in some embodiments, because contact has been made with that intersection point, processor(s) 202 of electronic device 10 may be configured to select second item 306. In some embodiments, the number of driving lines 218 and sensing lines 216 may be related to how precise the touch input is, and therefore, an accuracy of item selection within a user interface. For example, the greater the number of driving lines 218 and sensing lines 216, the greater the number of intersection points, and therefore the better resolution for accurately identifying which item(s) presented within a user interface on a display are associated with a particular intersection point or points.

At step 414, a second touch input may be detected at a second location on the touch screen. For example, a touch input may be detected at second location 360 of user interface 350. In some embodiments, the second touch input may necessarily be an additional touch input. For example, contact with display 212 may remain between first location 310 and second location 360. As finger 8 moves from first location 310 to second location 360, the capacitive coupling between finger 8 and the touch screen (e.g., display 212) may change from being detected at a first intersection point, to a second intersection point, to a third, and so on, until the capacitive coupling between an intersection point associated with second location 360, or any end point, occurs. At step 416, a determination may be made that a scroll or swipe gesture is being performed, or was performed, on display 212. In some embodiments, the velocity of the gesture from first location 310 to second location 360 may indicate that the gesture that was performed was a scroll gesture. In other embodiments, a determination of each intersection point along a path from first location 310 to second location 360 that capacitive coupling was detected may indicate that the gesture was a scroll gesture. Persons of ordinary skill in the art will recognize that any suitable technique for determining the type of gesture that was, or is being, performed on the touch screen may be employed, and the aforementioned are merely exemplary.

At step 418, the item that was determined to be associated with the origin point (e.g., second item 306), may be displayed at second location 360, or at a same vertical or horizontal position as second location 360. For example, second item 356 may be displayed at a same vertical position (e.g., Y2) associated with a vertical position of second location 360 (e.g., also Y2). In this way, the selected item, second item 356, "follows" the path of the scroll gesture (e.g., has a same vertical position as a point of contact on the touch screen) that is performed, and enables an individual's focus to remain on a same item throughout the duration of the gesture being performed.

At step 420, a second format for the items of the list may be determined. The second format, in some embodiments, may correspond to a new font size and/or line spacing for the items of the list. For example, because a scroll gesture was detected, a determination may be made that an individual is now located close to (e.g., within a few feet) electronic device 10. Therefore, the font size and line spacing used when presenting user interface 300 in the first format may no longer be suitable, as the previous presentation was optimized for viewing at far distances (e.g., seven to ten feet). Therefore, in some embodiments, it may be determined that the items of the list should be displayed such that they have second font size F2, and second line spacing D2, such that the items are more easily viewed when an individual is located close to (e.g., one to three feet) display 212 of electronic device 10.

At step 422, a determination may be made that one or more additional portions of the list may now fit within the user interface based on the new font size and new line spacing. For example, when the items of the list of user interface 300 are displayed, they may be displayed having first font size F1 and first line spacing D1. Furthermore, there may be more than two items in the list and, due to the font sizing and line spacing, only items 306 and 308 may be viewable. However, when the items are displayed using second font size F2 and second line spacing D2, more items, such as items 362 and 364, may be able to be presented within user interface 350. Furthermore, in some embodiments, some portions of already presented items may now be viewable when the font sizing and line spacing is changed. At step 424, second user interface 350, including additional items 362 and 364 as well as items 354 and 356, may be presented on display 212 of electronic device 10, where each of items 354, 356, 362, and 364 may be displayed in second font size F2 and having second line spacing D2.

FIG. 5 is an illustrative flowchart of a process for presenting a user interface in a first format or a second format depending on additional inputs to an electronic device, in accordance with various embodiments. Process 500, in one embodiment, may begin at step 502. At step 502, a user interface may be presented in a first format on a display, such as a touch screen, of an electronic device. For example, user interface 20 of FIG. 1 or user interface 300 of FIG. 3A may be presented on display 212 of electronic device 10. In some embodiments, user interface 20 or 300 may include a list of items, where each item of the list may be displayed in a first font size and having a first line spacing between each item. For example, user interface 300 may display first item 304 and second item 306 in first font size F1, and first item 304 and second item 306, which may be on a first line and second line, respectively, may have first line spacing D1 between the first line and second line. In some embodiments, the first format of the user interface, such as user interface 300, may be configured such that it is optimally viewed from a first distance away from the touch screen. For example, first font size F1 and first line spacing D1 may be set such that first item 304 and second item 306 are easily viewable from seven to ten feet away, however persons of ordinary skill in the art will recognize that this distance is merely exemplary.

At step 504, a scroll gesture may be detected on the touch screen (e.g., display 212) that is presenting the user interface. In some embodiments, the scroll gesture may be determined by detecting that contact is being made with the touch screen at a first location for more than a predefined period of time, indicating that the contact corresponds to a non-tap gesture, and then detecting the contact with the touch screen moves from the first location to a second location. For example, an object, such as finger 8 of individual 2, may contact display 212 at first location 310, such that electronic device 10 detects a change in capacitance of a first intersection point of a driving line 218 and a sensing line 216. In some embodiments, electronic device 10 may determine that finger 8 remains in contact with the touch screen (e.g., display 212), and also moves from first location 310 to second location 360. For example, a change in capacitance of second intersection point proximate to the first intersection point may be detected, followed by a change in capacitance of a third intersection point proximate the second intersection point, and so on, ending on a final intersection point, corresponding to second location 360.

At step 506, the user interface may be displayed in a second format. In response to detecting the scroll gesture, electronic device 10 may be configured to display user interface 30 of FIG. 1 or user interface 350 of FIG. 3, both being of a second format. For example, items of the list may now be displayed in second font size F2, and the items may have second line spacing D2. In some embodiments, displaying the items in second font size F2 and having second line spacing D2, user interface 350 may be more easily viewed from a second distance. For example, user interface 350 may be displayed such that it is optimally viewed from one to two feet away from display 212. This may be because, in response to detecting the scroll gesture, electronic device 10 may determine that an individual is likely located close to display 212, as they were able to perform a touch gesture thereon. Therefore, user interface 350, or user interface 30, may be presented so that it is easily viewable from a close distance, as opposed to the first format which was optimized for far views. In some embodiments, one or more additional items of the may also be displayed within user interface 350 based on the item's font size and line spacing being reduced. Furthermore, in some embodiments, a particular item may have been "selected" in response to the initial touch input of the scroll gesture, and that item may move in parallel with the scrolling gesture to ensure that an individual's focus remains on that item.

At step 508, a determination may be made as to whether or not any additional touch inputs have been detected by the touch screen. For example, after the scroll gesture has been detected and the format of the user interface has been modified, an individual may select an item from the items displayed on the user interface. As another example, the individual may modify the list after the scroll gesture to change the items being displayed in the second format. If, at step 508, it is determined that additional touch inputs have been detected, then process 500 may proceed to step 516 where the user interface may continue to be displayed in the second format. For instance, because additional touch inputs have been detected, this may mean that individual 2 is interacting with the touch screen, and therefore is still located close to electronic device 10. Therefore, user interface 30 or 350 may continue to be displayed on display 212. If, however, no additional touch inputs are detected, process 500 may proceed to step 510.

At step 510, a determination may be made as to whether or not a voice command has been detected by electronic device 10. As described above, electronic device 10 may also correspond to a voice activated electronic device. Therefore, in response to detecting a wakeword, such as "Alexa," electronic device 10 may configured to record and interpret subsequent speech following the wakeword as actionable inputs. In some embodiments, electronic device 10 may send audio data representing an utterance, "Alexa— What is the weather?", to backend system 100, and may receive audio data representing a response the utterance from backend system 100, which may be output through speaker(s) 210 and/or on display 212. Furthermore, in some embodiments, because a voice command was received at step 510, electronic device 10 may determine that individual 2 is no longer located "close" to electronic device 10 (e.g., greater than an arm's reach), and may therefore return to displaying a list, or other content, in the first format at step 512. For example, electronic device 10 may display first user interface 20 or first user interface 300 in response to the utterance, "Alexa—What is the weather?" being spoken, where first user interface 20 and/or first user interface 300 may be optimized for being viewed from afar.

If, however, at step 510, it is determined that no utterance has been spoken (e.g., no utterance including the wakeword), then process 500 may proceed to step 518. At step 518, a determination may be made as to whether or not a user is determined to be proximate to electronic device. In some embodiments, as described in greater detail below, a distance between an individual and electronic device 10 may be determined based on camera(s) 214, Bluetooth energy, a proximity sensor, electromagnetic field changes, face detection techniques, or any other suitable technique, or any combination thereof. If, at step 518, it is determined that the user is located proximate to electronic device 10, then process 500 may proceed to step 516, where the user interface may continue to be displayed in the second format, optimized for "near" or "close" viewing. If, however, at step 518 it is determined that the user is no long proximate to electronic device 10, then process 500 may proceed to step 514. At step 514, a determination may be made as to whether or not a predefined time period has elapsed, corresponding to a timeout period for electronic device 10. For example, if no touch inputs and no voice commands have been received within a few seconds (e.g., two seconds, five seconds, ten seconds, etc.), then it may be determined that individual 2 is no longer viewing or interacting with electronic device 10. If, at step 514, it is determined that the timeout period has elapsed, then process 500 may proceed to step 512, where the user interface may be presented in the first format. In some embodiments, however, if it is determined that the timeout period has elapsed at step 514, then a different user interface, such as an idle mode user interface or a sleep state user interface may be presented on display 212 of electronic device 10. For example, a screen saver may be presented on display 212. As another example, no images or content may be presented on display 212. However, if it is determined that, at step 514, the timeout period has not elapsed, then process 500 may proceed to step 516, where second user interface 350 may continue to be displayed.

FIGS. 6A-D are illustrative diagrams of an electronic device presenting various user interfaces depending on a proximity of an individual to the electronic device, as well as touch gestures performed to the electronic device, in accordance with various embodiments. In some embodiments, an individual, such as individual 2, may be located at a first distance X1 from their electronic device 610, such as within FIG. 6A. Electronic device 610, in an illustrative non-limiting embodiment, may be substantially similar to electronic device 10, with the exception that display 212 of electronic device 610 may be large enough that electronic device 610 may be mounted on a wall or on a stand. For example, electronic device 610 may correspond to a fifty-inch display, capable of presenting video and audio content thereon. In some embodiments, an additional device may perform one or more functionalities of electronic device 610. For example, one or more microphone(s) 208 of electronic device 610 may be located on an additional device in communication (e.g., hard-wired or wirelessly) with electronic device 610, however this is merely exemplary.

When located at first distance X1, individual 2 may speak an utterance 602, which may include a wakeword (e.g., "Alexa") followed by a question. For example, individual 2 may say utterance 602—"Alexa—What is the forecast?" In response to detecting the wakeword, electronic device 610 may generate and send audio data representing the utterance including the wakeword, subsequently followed by the question to backend system 100. Backend system 100 may generate text data representing the utterance, for instance using STT module 266 of ASR module 258, and may determine an intent of the utterance using NLU module 260. Furthermore, backend system 100 may obtain response information from one or category servers/skills of category servers/skills module 262, such as weather information obtained from a weather application. After receiving the response information, backend system 100 may generate responsive audio data representing a response message using TTS module 264. For example, a response message saying, "Here is the current weather forecast," may be generated and sent to electronic device 610, which in turn may be output through one or more speakers (e.g., speaker(s) 210) of electronic device 610.

In some embodiments, backend system 100 may also generate display data for a user interface to be displayed on a display of electronic device 610. For example, backend system 100 may generate display data representing a first user interface 604. Upon receipt of the display data, electronic device 610 may be configured to display first user interface 604 on display 212. First user interface 604 may, in an illustrative embodiment, include a list of items, such as items 608, which may be displayed within any suitable portion of first user interface 604. For instance, items 608 may correspond to weather items indicating one or more weather patterns and/or temperatures for one or more days of a week.

In some embodiments, in addition to sending audio data representing command 602 to backend system 100, electronic device 610 may also be configured to send location data representative of an approximate distance between individual 2 and electronic device 610. For example, electronic device 610 may send location data indicating that individual 2 is located at first distance X1 from electronic device 610. In some embodiments, backend system 100 may further be configured to formulate first user interface 604 such that it is optimally viewable by individual 2 when located at first distance X1. For instance, electronic device 610 may determine that individual 2 is located approximately ten to fifteen feet away from electronic device 610. Therefore, upon receiving the location data indicating that individual 2 is located ten to fifteen feet away, backend system 100 may generate display data representing first user interface 604 such that first user interface 604, when presented on display 212 of electronic device 610, includes items 608 displayed in a first size or first orientation such that they are easily viewable by individual 2. In some embodiments, not all of the response information obtained may be capable of fitting within first user interface 604 when presented so that the items have the first size/orientation, however, that information may be available upon additional inputs provided by individual 2.

Electronic device 610 may be capable determining first distance X1 using one or more techniques. In some embodiments, electronic device 610 may include one or more cameras 614 capable of detecting a human body part of individual 2, such as a head or torso, within a captured image, as well as determining one or more components of a background environment where individual 2 is located. Using the detected human body part(s) and/or the background environment, camera 614 and electronic device 610 may be capable of determining first distance X1. In some embodiments, a ratio of a field of vision of cameras 612 as compared to a region of interest ("ROI") associated with a face of an individual. As an illustrative example, if the ratio is greater than predefined ratio threshold. For example, the ratio of the field of vision as compared to the ROI about a face of individual 2 may be 70%. If the predefined ratio threshold is 60%, then this may indicate that individual 2 is within 1-3 feet of electronic device 610. In some embodiments, multiple ratio threshold may exist, each corresponding to a different approximate distance between individual 2 and electronic device 6. For example, if the ratio is 30%, then this may indicate that individual 2 is located 15-20 feet away from electronic device 10, as a predefined ratio threshold for being 15-20 feet from electronic device 610 may be 25%. As still another example, if the ratio is 50%, then this may indicate that individual 2 is located 7-15 feet from electronic device 10, as another predefined ratio threshold for being 7-15 feet from electronic device 610 may be 40%. However, persons of ordinary skill in the art will recognize that any predefined ratio threshold may be associated with any particular distance from electronic device 610, and the aforementioned are merely illustrative, non-limiting, and exemplary.

In another embodiment, electronic device 610 may be capable of determining first distance X1 based on an intensity of command 602 as detected by one or more microphone(s) 208 located thereon. For example, electronic device 610 may include one or more microphones for detecting sounds from ten to fifteen feet away, one or more microphones for detecting sounds from five to ten feet away, and one or more microphones for detecting sounds from less than five feet away. Depending on which microphone(s) detect command 602, an approximate distance between individual 2 and electronic device 610 may be determined, and this distance may be used to determining a format that first user interface 604 is to be displayed. Persons of ordinary skill in the art will recognize that although camera(s) 614 and/or microphone(s) 208 of electronic device 610 may be used to determine a distance of individual 2 from electronic device 610, any other suitable technique for approximating the distance of individual 2 from electronic device 610 may be employed, for instance a Bluetooth® energy, a wireless connection strength, radar, or any other functionality, or any combination thereof, and the aforementioned are merely exemplary.

In FIG. 6B, individual 2 may now be located at a second distance X2 from electronic device 610. In some embodiments, the distance of individual 2 from electronic device 610 may be determined using one or more of the aforementioned distance approximation techniques. Second distance X2 may, for instance, correspond to a distance less than first distance X1. For example, individual 2 may be located at approximately five to ten feet from electronic device 610.

In some embodiments, electronic device 610 may provide second location data corresponding to second distance X2 to backend system 100. For example, in response to determining that individual 2 is now located at second distance X2 from electronic device 610, electronic device 610 may be configured to send this information to backend system 100. Backend system 100 may then provide an updated user interface, such as a second user interface 624, to electronic device 10 to be displayed on display 212. Second user interface 624 may be similar to first user interface 604, with the exceptions that second user interface 624 may be formatted so that it is optimally viewable by individual 2 when located at second distance X2. For instance, second user interface 624 may include items 628, which may be of a second size and/or second location. In some embodiments, items 628 may include some or all of items 608, albeit those items may be formatted differently. For example, items 608 corresponded to a weather icon and temperature for two days, Monday and Tuesday, in a first size. Items 628 may correspond to a weather icon and temperature for Monday and Tuesday, as well as two additional days, Wednesday and Thursday, in a second size. As second user interface 624 may display items 628 in the second size, more items than were capable of being displayed within first user interface 604 may be presented within second user interface 624. However, additional items may still be available to be viewed (e.g., a Friday weather icon and temperature), but due to the second size of items 628 within second user interface 624, those additional items may not be viewable initially.

In some embodiments, in response to determining that individual 2 is located at distance X2, electronic device 610 may be configured to display second user interface 624. In this particular scenario, electronic device 610 may not need to communicate with backend system 100 to receive an updated user interface optimized for second distance X2. Instead, upon determining that individual 2 is located at second distance X2, electronic device 610 may be configured to modify the user interface currently being displayed from a first format (e.g., first user interface 604) to a second format (e.g., second user interface 624).

Figure 6C:
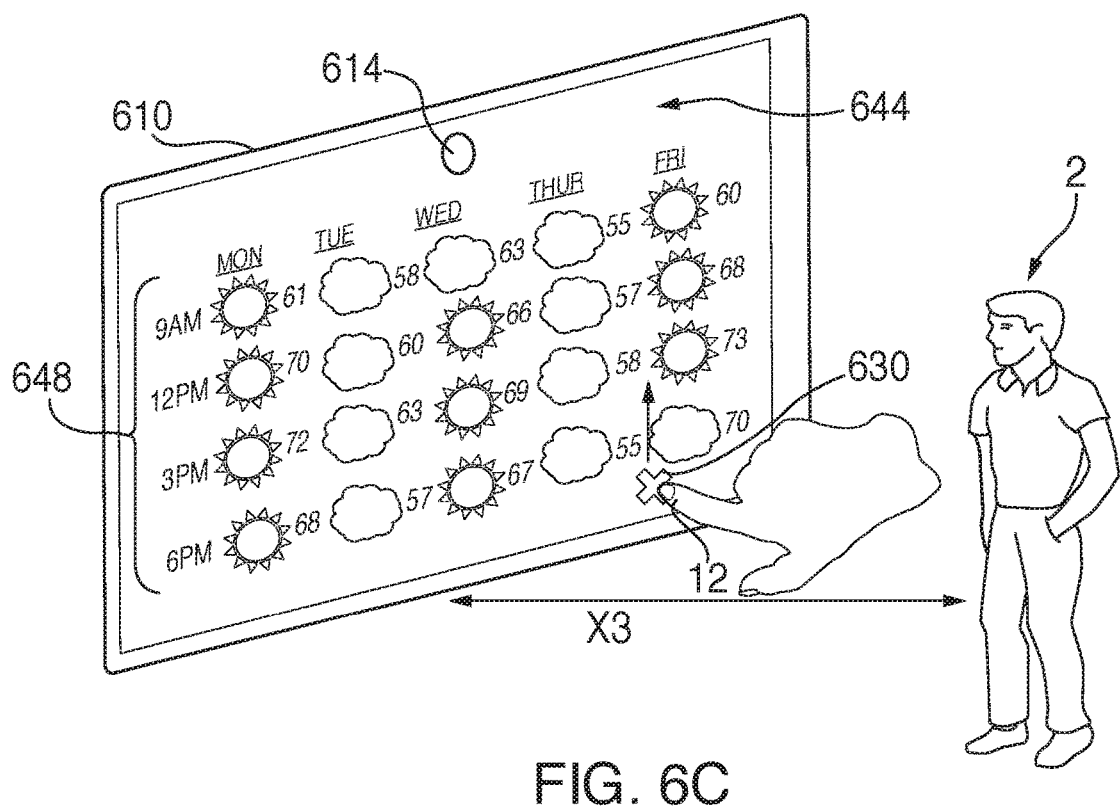

In FIG. 6C, individual 2 may now be located at a third distance X3 from electronic device 610. In some embodiments, the distance of individual 2 from electronic device 610 may again be determined using one or more of the aforementioned distance approximation techniques. Third distance X3 may, for instance, correspond to a distance less than first distance X1 and second distance X2. For example, individual 2 may be located less than approximately five feet from electronic device 610.

In some embodiments, electronic device 610 may provide third location data corresponding to third distance X3 to backend system 100. For example, in response to determining that individual 2 is now located at third distance X3 from electronic device 610, electronic device 610 may be configured to send this information to backend system 100. Backend system 100 may then provide another updated user interface, such as a third user interface 644, to electronic device 10 to be displayed on display 212. Third user interface 644 may be similar to second user interface 624, with the exceptions that third user interface 644 may be formatted so that it is optimally viewable by individual 2 when located at third distance X3. For instance, third user interface 644 may include items 648, which may be of a third size and/or third location. In some embodiments, items 648 may include some or all of items 608 and/or 628, albeit those items may be formatted differently. For example, items 648 may correspond to a weather icon and temperature for Monday-Friday, in a third size. As third user interface 654 may display items 658 in the third size, more items than were capable of being displayed within first user interface 604 or second user interface 624 may be presented. Furthermore, in some embodiments, additional information about items 648 may also be included within third user interface 644. For example, in first user interface 604 and second user interface 648, each item may have only included a day of the week, an icon corresponding to a current weather for that day, and a temperature. In third user interface 644, items 648 may be displayed in more granular detail due to the increased amount of content capable of being presented. For example, in addition to presenting items 648 for days Monday, Tuesday, Wednesday, Thursday, and Friday, a breakdown of a weather for various portions of the day (e.g., 9 AM, 12 PM, 3 PM, 6 PM) and a temperature for each of those portions of the day may be presented. Due to individual 2 being located at third distance X3, the additional content included within items 648 may be more easily presented because items 648 may be displayed in a third size, capable of being clearly viewed from a close distance, as opposed to, say items 604 of FIG. 6A, which were displayed in a first size for being viewed from afar.

In some embodiments, in response to determining that individual 2 is located at third distance X3, electronic device 610 may be configured to display third user interface 644. In this particular scenario, electronic device 610 may not need to communicate with backend system 100 to receive an updated user interface optimized for third distance X3. Instead, upon determining that individual 2 is located at third distance X3, electronic device 610 may be configured to modify the user interface currently being displayed from a first format (e.g., first user interface 604) or second format (e.g., second user interface 624), to a third format (e.g., third user interface 644).

In some embodiments, individual 2 may contact display 212 of electronic device 610 at a first location 630 using finger 12. Display 212 may, for instance, be a touch screen, as described in greater detail above, and display 212 may also present third user interface 644 thereon. Therefore, when individual 2 is located at third distance X3 from electronic device 610, individual 2 may be capable of providing one or more touch inputs to electronic device 610 to modify or access items 648, and/or activate one or more additional functionalities of electronic device 610. As an illustrative example, individual 2 may contact the touch screen at first location 630 to begin performing a scrolling gesture by moving their finger in an upward direction.

Figure 6D:
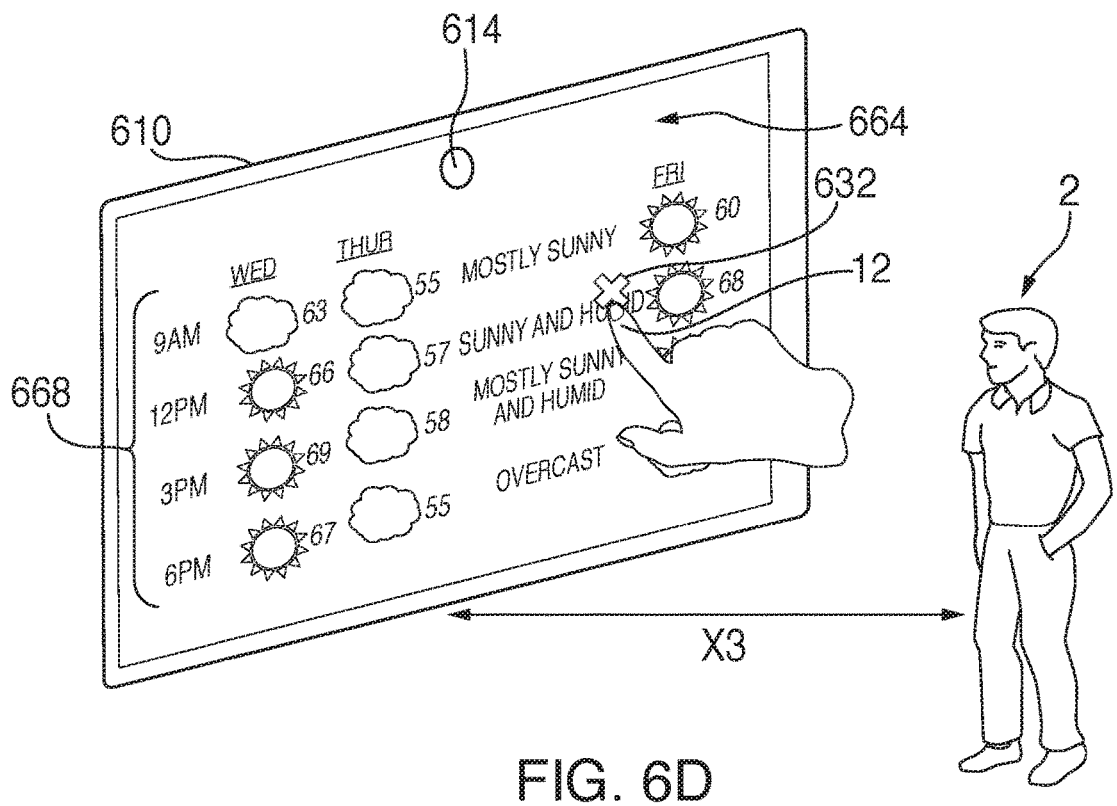

In FIG. 6D, individual 2 may still be located at third distance X3 from electronic device 610, however individual 2 may have performed, or may be still performing the scroll gesture such that finger 12 is not located at second location 632 on display 212. Electronic device 610 may be configured to detect the scroll gesture, as described in greater detail above, and may cause a fourth user interface 664 to be displayed on display 212. In some embodiments, fourth user interface 664 may include additional items or modified items 668. For example, items 668 may include some of the same items as items 648 of third user interface 644, however in fourth user interface 664, even more detail may be provided.

As an illustrative example, the scroll gesture performed may be determined to be associated the Friday weather information of items 648 of third user interface 644. In response to detecting the scrolling gesture, electronic device 610 may present additional information with the Friday weather information, such as a description of the weather during the various time periods of that day. In some embodiments, items 668 may be displayed in a fourth size or location, and some of the items previously presented within third user interface 644 may be removed or altered. For example, weather information for days Monday and Tuesday may be removed from fourth user interface 664. Persons of ordinary skill in the art will recognize that the user of weather information is merely exemplary, and any item or items, lists, groupings, or sets of content may be presented within any user interface, and the aforementioned is merely exemplary.

In some embodiments, one or more of the previous user interfaces (e.g., first, second, or third user interface 604, 624, or 644) may again be presented on display 212 of electronic device 610 in response to a voice command being detected thereby. Furthermore, one of the previous user interfaces may also be presented on display 212 if a predefined time period, corresponding to a timeout period, elapses and no additional touch inputs or voice commands are detected by electronic device 610. However, if additional touch inputs are detected on the touch screen (e.g., display 212), then electronic device 610 may continue to display fourth user interface 664, as individual 2 is likely still located at distance X3, and therefore individual 2 may still be interacting with the touch screen.

Figure 7:
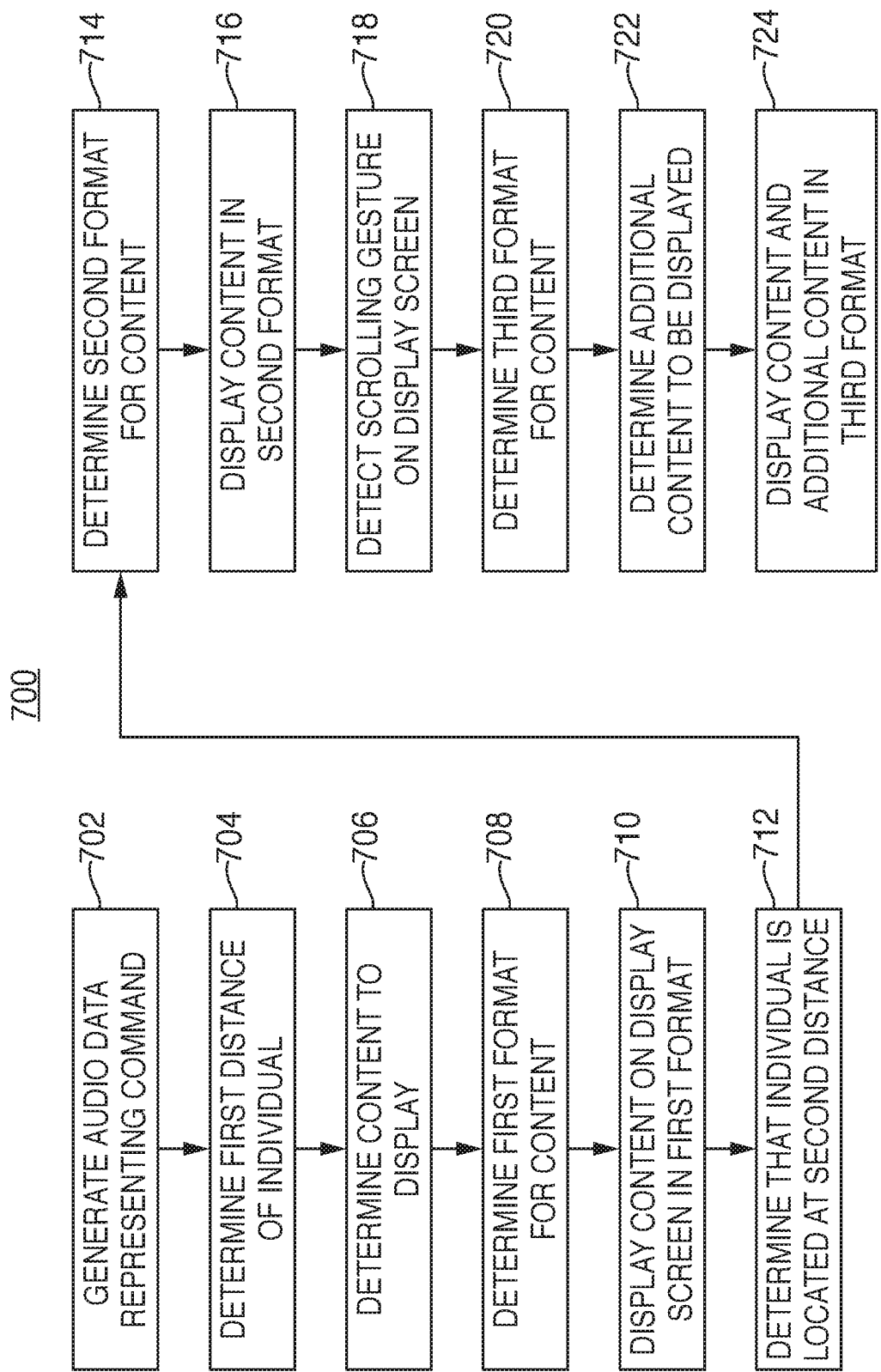
FIG. 7 is an illustrative flowchart of a process for presenting various user interfaces depending on an individual's proximity from an electronic device and a touch gesture detected by the electronic device, in accordance with various embodiments.

FIG. 7 is an illustrative flowchart of a process for presenting various user interfaces depending on an individual's proximity from an electronic device and a touch gesture detected by the electronic device, in accordance with various embodiments. Process 700, in some embodiments, may begin at step 702. At step 702, audio data representing a command may be received an electronic device. For example, electronic device 610 may receive audio of command 602 spoken by individual 2. Command 602 may include an utterance of a wakeword for electronic device 610, which may subsequently be followed by a question/statement/request. Upon detecting the wakeword (e.g., "Alexa"), one or more microphones 208 of electronic device 610 may record audio of command 602. In some embodiments, electronic device 610 may send the audio data representing command 602 to backend system 100 to obtain a response to command 602.

At step 704, a determination may be made that individual 2, or an individual who provided the command, is located at a first distance from electronic device 610. For example, individual 2 may be located at first distance X1 from electronic device 610. In some embodiments, the distance between electronic device 610 and individual 2 may be determined based on imagery captured by camera(s) 614, microphone(s) 208, or any other proximity detection means, or any combination thereof. In one exemplary embodiment, electronic device 610 may determine that the first distance (e.g., first distance X1), is approximately ten to fifteen feet from electronic device 610.

At step 706, content to be displayed on display 212 of electronic device 610 may be determined. In some embodiments, electronic device 610 may send the audio data representing command 602 to backend system 100, and backend system 100 may send display data representing a user interface to be presented to electronic device 610. At step 708, a first format for the content may be determined. For instance, electronic device 610 may also send location data indicating that individual 2 is located at first distance X1 to backend system 100. In this scenario, the content to be displayed on display 212 of electronic device 610 may be formatted such that it is optimally viewable by individual 2 located at first distance X1. For example, if first distance X1 corresponds to individual 2 being ten to fifteen feet away from electronic device 610, then the content may be formatted such that will be easily viewable by individual 2 from ten to fifteen feet away.

At step 710, the content may be presented on display 212 of electronic device 610 in the first format. In some embodiments, first user interface 604 may be presented, which may be formatted such that items 608 are viewable by individual 2 located at distance X1. For example, items 608 may be displayed in a first size, which may be large enough such that items 608 are easily viewable by individuals located between ten to fifteen feet from display 212, which first user interface 604 may be presented thereon. Persons of ordinary skill in the art will recognize that, in reference to process 700, first distance X1 and first user interface 604 or second distance X2 and second user interface 624 may be used with relation to steps 702-710.

At step 712, a determination may be made that individual 2 is now located at a second distance from electronic device 610. For example, electronic device 610 may determine, based on imagery captured by camera(s) 614 or by any other suitable technique, that individual 2 may now be located at distance X3 from electronic device 610. Based on individual 2 being located at distance X3, electronic device 610 may determine that the content that was previously displayed is now to be displayed in a second format, at step 714. For example, based on individual 2 being located at distance X3, electronic device 610 may present user interface 644 on display 212. User interface 644, as described in greater detail above, may be formatted such that it is optimally viewed from a close distance, such as less than five feet away. In some embodiments, because distance X3 is determined to be five feet or less from electronic device 610, user interface 644 may be determined to be an optimal user interface to display items 648, such that individual 2 may easily view and/or interact with them at that distance. In some embodiments, user interface 644 may present items 648 in a different size, shape, and/or location as compared to items 608 of user interface 604. For example, items 648 may be displayed in a smaller size, with smaller font, smaller line spacing, or in any other suitable manner as compared with items 604 such that items 648 are easily viewed from a close distance (e.g., less than five feet). At step 716, the content may be displayed in the second format. For example, user interface 644 may be presented on display 212 of electronic device 610.

At step 718, a scrolling gesture may be detected at a first location on display 212, which may be a touch screen. For example, contact with the touch screen may be detected at first location 630. In some embodiments, the scrolling gesture may be detected based on contact with the touch screen being maintained while the location of that contact changing. For instance, contact with the touch screen may initially be detected at first location 630, however it may move to second location 632.

In response to detecting the scrolling gesture, electronic device 610 may be configured to present the content in a third format at step 720. For instance, because a scrolling gesture was detected, this may indicate that individual 2 is located proximate to electronic device 610, and may be capable of interacting with display 212. Therefore, some or all of items 648 may be modified or displayed in a different format to provide individual 2 with an enhanced user experience. For example, items 668 may be displayed within user interface 664 such that items 668 are of a smaller size than items 608 or 628 of other user interfaces where individual 2 is located further from electronic device 610.

At step 722, additional content may be determined to be able to be displayed within the third format of the content of step 720. For example, additional information, such as detailed weather information as seen with items 668 of user interface 664 may be determined to be displayable. At step 724, the additional content, and some or all of the previous content that was displayed, may be presented on display 212 of electronic device 610.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:
generating, at a voice activated electronic device including a touch screen, first audio data including a wakeword subsequently followed by a first request;
determining image data representing an image captured by a camera of the voice activated electronic device, the camera having a field of vision;
determining that a face is represented in the image data;
determining a region of interest ("ROI") associated with the face;
determining a first ratio of the field of vision as compared to the ROI; and
determining that the first ratio is greater than a predefined ratio threshold indicating that the face is located in a first distance range;
sending the first audio data and the first distance range to a system;
receiving, from the system, first display data for a first user interface that includes a first item and a second item based on the first distance range;
displaying, on the touch screen, the first user interface such that the first item is displayed along a first horizontal line of a list and the second item is displayed along a second horizontal line of the list, wherein displaying includes:
displaying the first item in a first font size; and
displaying the second item in the first font size, the first item and the second item having a first line spacing therebetween;
determining that a first scrolling gesture was performed on the touch screen;
determining, based on the first scrolling gesture, a second distance range between a user and the touch screen;

displaying a second user interface on the touch screen including:
    displaying a third item in a second font size, wherein the second font size is smaller than the first font size, and wherein the third item is based on the second distance range; and
    displaying the second item in the second font size, the third item and the second item having a second line spacing therebetween, wherein the second line spacing is smaller than the first horizontal line spacing.

2. The method of claim 1, further comprising:
generating second audio data representing a first utterance including the wakeword subsequently followed a second request for weather information, the first utterance being detected by a microphone of the voice activated electronic device;
determining, based on an intensity of the first utterance, a third distance range between the user and the voice activated electronic device;
sending the second audio data and the third distance range to the system;
receiving second display data for a third user interface that includes a picture and text associated with a current weather forecast; and
displaying, on the touch screen, the third user interface including the picture being displayed at a first picture size and the text being displayed at a third font size.

3. The method of claim 1, wherein displaying the second user interface further comprises:
displaying a fourth item along a third horizontal line of the list such that the fourth item is displayed at a first location on the touch screen having a first spacing difference with the second item such that the second item is located above the fourth item on the touch screen;
displaying the fourth item in the second font size;
displaying a fifth item along a fourth horizontal line of the list such that the fifth item is displayed at a second location on the touch screen also having the first spacing difference between the fourth item such that the fourth item is located above the fifth item on the touch screen;
displaying the fifth item in the second font size; and
displaying the first item, the second item, the fourth item, and the fifth item within the second user interface having the second line spacing therebetween.

4. A method, comprising:
receiving, at a device, a first voice input;
determining, by the device and based on the first voice input, image data representing an image captured by an image capturing device;
determining, by the device, that a face is represented in the image data;
determining, by the device, that the face is located within a first distance range from the device;
displaying, by a display device and based on the first distance range, a first content item in a first format;
receiving, by the device, a second voice input;
determining, by the device and based on an intensity of the second voice input, a second distance range;
displaying, by the display device, the first content item and a second content item in a second format based on the second distance range, wherein the second format is different than the first format;
receiving, by the display device, a first touch input;
determining, based on the first touch input, a third distance range;
determining, based on the third distance range, that the first content item and the second content item are to be displayed in a third format; and
displaying, by the display device, the first content item and the second content item in the third format.

5. The method of claim 4, wherein the display device is integral to the device.

6. The method of claim 4, further comprising:
generating, based on the first voice input, audio data representing an utterance;
sending the audio data and the first distance range to a remote device; and
receiving, from the remote device, display data for the first content item.

7. The method of claim 4, further comprising:
displaying, by the display device, a third content item in the third format.

8. The method of claim 4, further comprising:
determining a first spacing associated with the first format; and
determining a second spacing associated with the second format, wherein the second spacing is less than the first spacing.

9. The method of claim 4, further comprising:
detecting a first touch input at a location on a display;
determining that a third item is associated with the location;
determining supplemental information associated with the third item; and
displaying the supplemental information, wherein the supplemental information is displayed with the third item on the display.

10. The method of claim 4, further comprising:
displaying, based on the first distance range, the first content item and a third content item using a first spacing between the first content item and the third content item; and
displaying, based on the second distance range, the second content item and a fourth content item, wherein the second content item and fourth content item are displayed using a second spacing between the second content item and the fourth content item, wherein the second spacing is less than the first spacing.

11. The method of claim 4, wherein the image capturing device has a field of vision, the method further comprising:
determining a region of interest ("ROI") associated with the face; and
determining a ratio of the field of vision as compared to the ROI,
wherein determining the face is located within the first distance range is based on the ratio.

12. An electronic device, comprising:
communications circuitry;
at least one microphone;
memory; and
at least one processor operable to:
    receive a first voice input;
    determine, based on the first voice input, image data representing an image captured by the electronic device;
    determine that a face of a user is represented in the image data;
    determine that the face is located within a first distance range from the electronic device;
    display, based on the first distance range, a first content item in a first format;
    receive a second voice input;

determine, based on an intensity of the second voice input, a second distance range;

display the first content item and a second content item in a second format based on the second distance range, wherein the second format is different than the first format;

receive a first touch input;

determine, based on the first touch input, a third distance range to the user; and display, in response to the first touch input, a third content item on the display in a third format based on the third distance range.

13. The electronic device of claim 12, wherein the at least one processor is further operable to:

display, in response to the first touch input, the first content item and the second content item on the display in the third format based on the third distance range.

14. The electronic device of claim 12, wherein the at least one processor is further operable to:

generate, based on the first voice input, audio data representing an utterance;

send, using the communications circuitry, the audio data and the first distance range to a remote device; and receive, using the communications circuitry, display data for the first content item.

15. The electronic device of claim 12, wherein the at least one processor is further operable to:

generate, based on the second voice input, audio data representing an utterance; and send, using the communications circuitry, the audio data and the second distance range to a remote device.

16. The electronic device of claim 12, wherein the at least one processor is further operable to:

determine a first spacing associated with the first format; and determine a second spacing associated with the second format, wherein the second spacing is less than the first spacing.

17. The electronic device of claim 12, wherein the at least one processor is further operable to:

detect a first touch input at a location on the display;

determine that a fourth content item is associated with the location;

determine supplemental information associated with the fourth content item; and display the supplemental information on the display, wherein the supplemental information is displayed with the fourth content item on the display.

18. The electronic device of claim 12, wherein the at least one processor is further operable to:

display, based on the first distance range, the first content item and a fourth content item using a first spacing between the first content item and the fourth content item; and display, based on the second distance range, the second content item and a fifth content item, wherein the second content item and fifth content item are displayed using a second spacing between the second content item and the fifth content item, wherein the second spacing is less than the first spacing.

19. The electronic device of claim 12, wherein the image data is captured by an image capturing component of the electronic device, and the imaging capturing component has a field of vision, wherein the at least one processor is further operable to:

determine a region of interest ("ROI") associated with the face; and determine a ratio of the field of vision as compared to the ROI, wherein determining the face is located within the first distance range is based on the ratio.

* * * * *